(12) United States Patent
Kasperchik et al.

(10) Patent No.: US 12,214,421 B2
(45) Date of Patent: *Feb. 4, 2025

(54) THREE-DIMENSIONAL (3D) PRINTING

(71) Applicant: HEWLETT-PACKARD DEVELOPMENT COMPANY, L.P., Spring, TX (US)

(72) Inventors: Vladek Kasperchik, Corvallis, OR (US); Mohammed S. Shaarawi, Corvallis, OR (US); Michael G. Monroe, Corvallis, OR (US); David Michael Ingle, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 159 days.

This patent is subject to a terminal disclaimer.

(21) Appl. No.: 17/838,050

(22) Filed: Jun. 10, 2022

(65) Prior Publication Data

US 2022/0297182 A1    Sep. 22, 2022

Related U.S. Application Data

(63) Continuation of application No. 16/077,770, filed as application No. PCT/US2017/019298 on Feb. 24, 2017, now Pat. No. 11,389,867.

(51) Int. Cl.
*B22F 10/14* (2021.01)
*B22F 1/05* (2022.01)
(Continued)

(52) U.S. Cl.
CPC ............... *B22F 10/14* (2021.01); *B22F 1/05* (2022.01); *B22F 1/10* (2022.01); *B22F 3/1021* (2013.01);
(Continued)

(58) Field of Classification Search
None
See application file for complete search history.

(56) References Cited

U.S. PATENT DOCUMENTS 3,704,275 A    11/1972  Burg et al.
5,340,656 A     8/1994  Sachs et al.
(Continued)

FOREIGN PATENT DOCUMENTS

| CN | 1163631 A | 10/1997 |
|----|-----------|---------|
| CN | 1711223 A | 12/2005 |
| CN | 1812878 A | 8/2006 |
| CN | 101010161 A | 8/2007 |
| CN | 101068503 A | 11/2007 |
| CN | 101264517 A | 9/2008 |
| CN | 101489704 A | 7/2009 |
| CN | 101646402 A | 2/2010 |

(Continued)

OTHER PUBLICATIONS

"Introducing Bldrmetal(Trademark) Powders for Binder Jet 3D Printing", NanoSteel, Sep. 24, 2015, 4 pages.

(Continued)

*Primary Examiner* — Colin W. Slifka
(74) *Attorney, Agent, or Firm* — Dierker & Kavanaugh, P.C.

(57) ABSTRACT

In a three-dimensional (3D) printing method example, a metallic build material is applied. A binder fluid is selectively applied on at least a portion of the metallic build material. The binder fluid includes a liquid vehicle and polymer particles dispersed in the liquid vehicle. The application of the metallic build material and the selective application of the binder fluid are repeated to create a patterned green part. The patterned green part is heated to at about a melting point of the polymer particles to activate the binder fluid and create a cured green part. The cured green part is heated to a thermal decomposition temperature of the polymer particles to create an at least substantially polymer-free gray part. The at least substantially polymer-free gray part is heated to a sintering temperature to form a metallic part.

14 Claims, 5 Drawing Sheets

(51) Int. Cl.

| | |
|---|---|
| *B22F 1/10* | (2022.01) |
| *B22F 3/10* | (2006.01) |
| *B22F 10/10* | (2021.01) |
| *B22F 10/16* | (2021.01) |
| *B22F 10/32* | (2021.01) |
| *B22F 10/34* | (2021.01) |
| *B22F 10/50* | (2021.01) |
| *B22F 12/10* | (2021.01) |
| *B29C 64/165* | (2017.01) |
| *B29C 64/209* | (2017.01) |
| *B29C 64/295* | (2017.01) |
| *B29C 64/371* | (2017.01) |
| *B33Y 10/00* | (2015.01) |
| *B33Y 30/00* | (2015.01) |
| *B33Y 70/00* | (2020.01) |
| *B33Y 70/10* | (2020.01) |
| *C08L 13/02* | (2006.01) |
| *C22C 1/04* | (2023.01) |
| *B22F 1/103* | (2022.01) |
| *B22F 5/08* | (2006.01) |
| *B22F 12/53* | (2021.01) |
| *B22F 12/63* | (2021.01) |
| *C08K 5/053* | (2006.01) |

(52) U.S. Cl.
CPC .............. *B22F 10/10* (2021.01); *B22F 10/16* (2021.01); *B22F 10/32* (2021.01); *B22F 10/34* (2021.01); *B22F 10/50* (2021.01); *B22F 12/10* (2021.01); *B29C 64/165* (2017.08); *B29C 64/209* (2017.08); *B29C 64/295* (2017.08); *B29C 64/371* (2017.08); *B33Y 10/00* (2014.12); *B33Y 30/00* (2014.12); *B33Y 70/00* (2014.12); *B33Y 70/10* (2020.01); *C08L 13/02* (2013.01); *C22C 1/0425* (2013.01); *B22F 1/103* (2022.01); *B22F 3/10* (2013.01); *B22F 3/1007* (2013.01); *B22F 5/08* (2013.01); *B22F 12/53* (2021.01); *B22F 12/63* (2021.01); *B22F 2201/013* (2013.01); *B22F 2201/02* (2013.01); *B22F 2201/04* (2013.01); *B22F 2201/20* (2013.01); *B22F 2304/10* (2013.01); *B22F 2998/10* (2013.01); *B22F 2999/00* (2013.01); *C08K 5/053* (2013.01); *Y02P 10/25* (2015.11)

(56) References Cited

U.S. PATENT DOCUMENTS

| | | | |
|---|---|---|---|
| 5,387,380 | A | 2/1995 | Cima et al. |
| 6,433,117 | B1 | 8/2002 | Ma et al. |
| 6,508,980 | B1 | 1/2003 | Sachs et al. |
| 6,596,224 | B1 | 7/2003 | Sachs et al. |
| 6,624,225 | B1 | 9/2003 | Ellison et al. |
| 6,746,506 | B2 | 6/2004 | Liu et al. |
| 6,819,906 | B1 | 11/2004 | Herrmann et al. |
| 7,108,733 | B2 | 9/2006 | Enokido |
| 7,141,207 | B2 | 11/2006 | Jandeska et al. |
| 7,220,380 | B2 | 5/2007 | Farr et al. |
| 7,608,646 | B1 | 10/2009 | Ganapathiappan et al. |
| 9,133,344 | B2 | 9/2015 | Ganapathiappan et al. |
| 9,156,999 | B2 | 10/2015 | Ng et al. |
| 9,327,448 | B2 | 5/2016 | Shah et al. |
| 9,550,328 | B2 | 1/2017 | Donaldson |
| 2001/0050031 | A1 | 12/2001 | Bredt et al. |
| 2004/0145088 | A1 | 7/2004 | Patel et al. |
| 2005/0003189 | A1 | 1/2005 | Bredt et al. |
| 2005/0007908 | A1 | 1/2005 | Yonemitsu |
| 2005/0049739 | A1 | 3/2005 | Kramer et al. |
| 2005/0079086 | A1 | 4/2005 | Farr et al. |
| 2005/0191200 | A1 | 9/2005 | Canzona et al. |
| 2006/0045787 | A1 | 3/2006 | Jandeska et al. |
| 2006/0071367 | A1 | 4/2006 | Hunter et al. |
| 2006/0079086 | A1 | 4/2006 | Boit et al. |
| 2006/0240259 | A1 | 10/2006 | Toyoda et al. |
| 2007/0216742 | A1 | 9/2007 | Sarkisian et al. |
| 2008/0277837 | A1 | 11/2008 | Liu et al. |
| 2009/0022615 | A1 | 1/2009 | Entezarian |
| 2012/0092428 | A1 | 4/2012 | Ganapathiappan et al. |
| 2012/0156605 | A1 | 6/2012 | Vanbesien et al. |
| 2012/0274015 | A1 | 11/2012 | Terrero et al. |
| 2013/0085217 | A1 | 4/2013 | Iu et al. |
| 2013/0207333 | A1 | 8/2013 | Brundige et al. |
| 2014/0072777 | A1 | 3/2014 | Boday et al. |
| 2014/0227123 | A1 | 8/2014 | Gunster et al. |
| 2015/0069649 | A1 | 3/2015 | Bai et al. |
| 2015/0125334 | A1 | 5/2015 | Uetani et al. |
| 2015/0166277 | A1 | 6/2015 | Shelhart et al. |
| 2015/0191641 | A1 | 7/2015 | Mazard et al. |
| 2015/0314530 | A1 | 11/2015 | Rogren |
| 2015/0328835 | A1 | 11/2015 | Wu et al. |
| 2016/0040025 | A1 | 2/2016 | Norikane et al. |
| 2016/0083304 | A1 | 3/2016 | Mironets et al. |
| 2016/0158843 | A1 | 6/2016 | Yolton et al. |
| 2016/0325356 | A1 | 11/2016 | Hirata et al. |
| 2017/0028475 | A1 | 2/2017 | Heikkila |
| 2017/0080497 | A1 | 3/2017 | Tuffile et al. |
| 2018/0298222 | A1 | 10/2018 | Zhang et al. |

FOREIGN PATENT DOCUMENTS

| | | |
|---|---|---|
| CN | 102884145 A | 1/2013 |
| CN | 103419270 A | 12/2013 |
| CN | 103534099 A | 1/2014 |
| CN | 103702811 A | 4/2014 |
| CN | 204018721 U | 12/2014 |
| CN | 105057664 A | 11/2015 |
| CN | 105364065 A | 3/2016 |
| CN | 105658416 A | 6/2016 |
| CN | 106255582 A | 12/2016 |
| CN | 106363170 A | 2/2017 |
| DE | 10021490 A1 | 11/2001 |
| DE | 112004000682 T5 | 4/2006 |
| EP | 1841381 A1 | 10/2007 |
| EP | 3117982 B1 | 12/2019 |
| JP | 07-507508 A | 8/1995 |
| JP | 2004-306557 A | 11/2004 |
| JP | 5334233 B2 | 11/2013 |
| JP | 2014-522331 A | 9/2014 |
| JP | 2015-528032 A | 9/2015 |
| JP | 2016-037041 A | 3/2016 |
| JP | 2016-040121 A | 3/2016 |
| JP | 2016-525993 A | 9/2016 |
| JP | 2016-179638 A | 10/2016 |
| JP | 2016-221682 A | 12/2016 |
| KR | 10-2016-0091329 A | 8/2016 |
| RU | 2535704 C1 | 12/2014 |
| WO | 02/64471 A1 | 8/2002 |
| WO | 2006/079459 A1 | 8/2006 |
| WO | 2007/039450 A1 | 4/2007 |
| WO | 2009/139393 A1 | 11/2009 |
| WO | 2013/128416 A2 | 9/2013 |
| WO | 2015/171182 A1 | 11/2015 |
| WO | 2016/053305 A1 | 4/2016 |
| WO | 2016/068899 A1 | 5/2016 |
| WO | 2016/072076 A1 | 5/2016 |
| WO | 2016/175817 A1 | 11/2016 |
| WO | 2017/014784 A1 | 1/2017 |
| WO | 2017/018984 A1 | 2/2017 |
| WO | 2017/112628 A1 | 6/2017 |

OTHER PUBLICATIONS

Bai, Y., et al., "An Exploration of Binder Jetting of Copper", Rapid Prototyping Journal, vol. 21, No. 2, 2015, pp. 793-814.

Evonik Operations GmbH, "Substrate wetting additive SURFYNOL (Registered) 465" retrieved at https://www.productcenter.coating-additives.com/pdf/daten/engl/SURFYNOL_465.pdf, retrieved on Jul. 1, 2021, 1 page.

(56) References Cited

OTHER PUBLICATIONS

Frank, J., et al., "Latexes", Science & Technology 4th Edition, Chapter 3, 2017, pp. 1-16.
Hengqian, H., "Progress in the World Chemical industry," May 1984, Ministry of Chemical industry, Beijing, China, pp. 266-271.
Huang. H. "Progress in the World Chemical Industry", Ministry of Chemical Industry, Beijing, China, May 1984, pp. 266-271. (+English Summary).
Jakus, A., et al., "Metallic Architectures from 3D-Printed Powder-Based Liquid Inks", Advanced Functional Materials, vol. 25, Issue 45, Dec. 2, 2015, pp. 6985-6995.
James, W. B., et al., "Powder Metallurgy Methods and Applications", ASM, vol. 7, 2015, pp. 1-11.
Jianzhong, M., "Synthesis Principle and Application Technology of Leather Chemicals," Aug. 2009, China Light Industry Press, pp. 1-10.
Kabanov, V.A., et al., "Encyclopedia of Polymers", L-PolynosiC fibers, Publishing: "Sovetskaya Entsiklodedia", 1990, pp. 1-17.
Knunyants, I. L., et al., "Synthetic Latexes, Chemical Encyclopedia," Non-Official Translation, vol. 2, 1990, pp. 1-4.
Lai, Z., et al., "Kinetics of Emulsion Polymerization of Styrene Using the Reactive Surfactant Hitenol BC20," Journal of Applied Polymer Science, vol. 109, 2008, pp. 2275-2282.
Li, L., et al. "Coating Compounding Technique", Printing Industry Press, Beijing China, Jul. 2001, p. 363-365.(+English Summary).
Procopio, L. J., et al., "Acrylic Coatings", ASM Handbook, vol. 5B, 2015, pp. 1-15.
Shen. X., "Powder Metallurgy Manufacturing Engineering", National Defence Industry Press, Beijing, China, Jun. 2015, pp. 130-133. (+English Summary).
Utela, R, B., et al., "Development Process for Custom Three-Dimensional Printing (3DP) Material Systems,", J. Manuf. Sci. Eng., Feb. 2010, vol. 132, Issue 1, pp. 1-9.
Wang, et .al., "Multicomponent Polymers: Principle, Structure and Properties," Tongji University Press, Shanghai, China, Oct. 31, 2013, p. 7 and p. 178-179. (+English Summary).
Allen, S. M., et al., "Three-Dimensional Printing of Metal Parts for Tooling and Other Applications", Metals and Materials, vol. 6, No. 6, Nov. 1, 2000, pp. 589-594.

THREE-DIMENSIONAL (3D) PRINTING

CROSS-REFERENCE TO RELATED APPLICATIONS

This application is a continuation of U.S. application Ser. No. 16/077,770, filed Aug. 14, 2018, now U.S. Pat. No. 11,389,867, which itself is a national stage entry under 35 U.S.C. § 371 of PCT/US2017/019298, filed Feb. 24, 2017, each of which is incorporated by reference herein in its entirety.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material. This is unlike traditional machining processes, which often rely upon the removal of material to create the final part. 3D printing often requires curing or fusing of the building material, which for some materials may be accomplished using heat-assisted extrusion, melting, or sintering, and for other materials may be accomplished using digital light projection technology.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
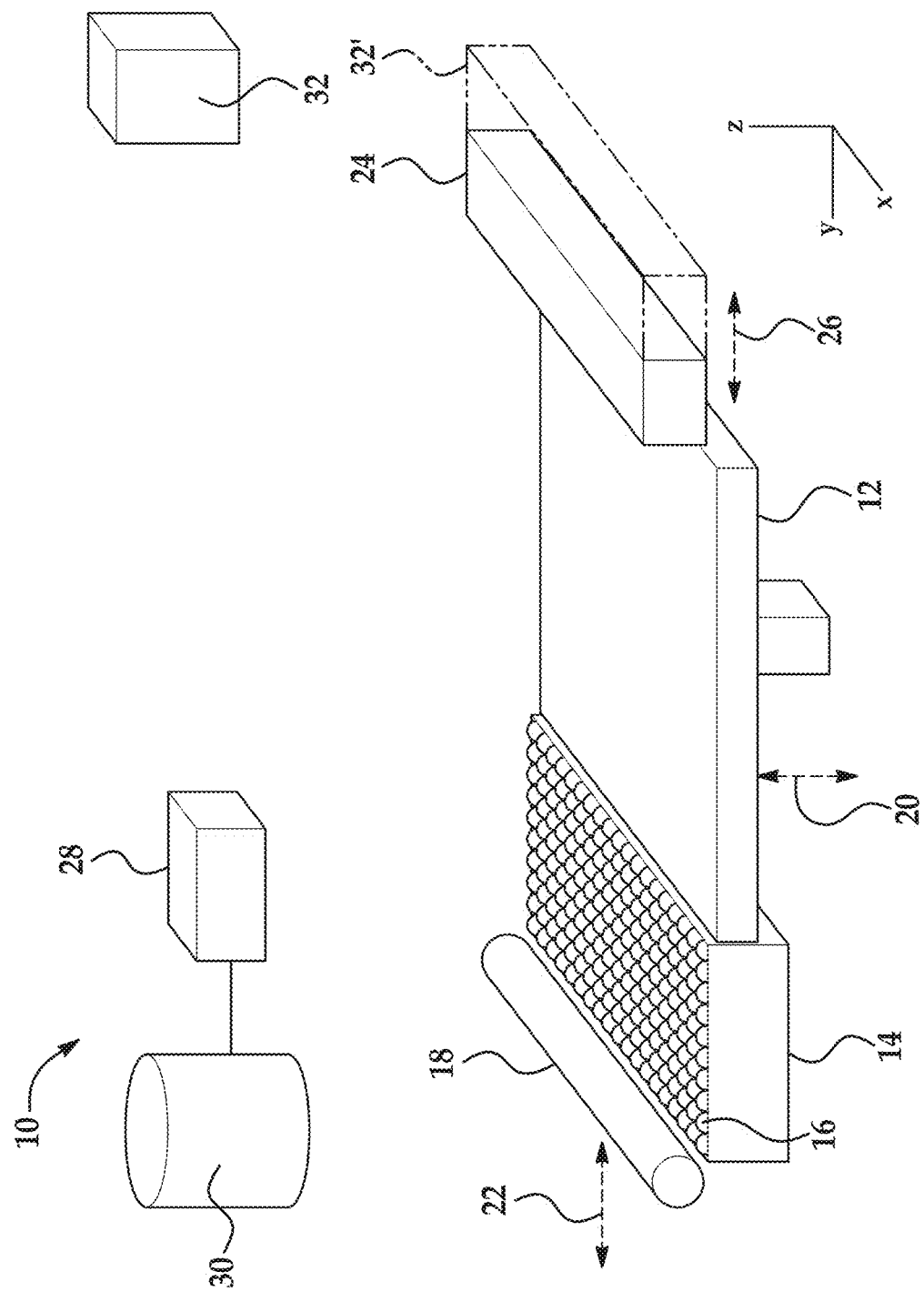
FIG. 1 is a simplified isometric view of an example 3D printing system disclosed herein.

In some examples of three-dimensional (3D) printing, a binder fluid (also known as a liquid functional agent/material) is selectively applied to a layer of build material, and then another layer of the build material is applied thereon. The binder fluid may be applied to this other layer of build material, and these processes may be repeated to form a green part (also referred to as a green body) of the 3D part that is ultimately to be formed. The binder fluid may include a binder that holds the build material of the green part together. The green part may then be exposed to electromagnetic radiation and/or heat to sinter the build material in the green part to form the 3D part.

Examples of the 3D printing method and system disclosed herein utilize a binder fluid, which includes polymer particles, in order to produce a patterned green part from metallic build material, and also utilize heat to activate the polymer particles and create a cured green part. The cured green part can be removed from the metallic build material that was not patterned with the binder fluid, without deleteriously affecting the structure of the cured green part. The extracted, cured green part can then undergo de-binding to produce an at least substantially polymer-free gray part, and the at least substantially polymer-free gray part may then undergo sintering to form the final 3D printed part/object.

As used herein, the term "patterned green part" refers to an intermediate part that has a shape representative of the final 3D printed part and that includes metallic build material patterned with the binder fluid. In the patterned green part, the metallic build material particles may or may not be weakly bound together by one or more components of the binder fluid and/or by attractive force(s) between the metallic build material particles and the binder fluid. In some instances, the mechanical strength of the patterned green part is such that it cannot be handled or extracted from a build material platform. Moreover, it is to be understood that any metallic build material that is not patterned with the binder fluid is not considered to be part of the patterned green part, even if it is adjacent to or surrounds the patterned green part.

As used herein, the term "cured green part" refers to a patterned green part that has been exposed to a heating process that initiates melting of the polymer particles (which may be facilitated by a coalescing solvent) in the binder fluid and that may also contribute to the evaporation of the liquid components of the binder fluid so that the polymer particles form a polymer glue that coats the metallic build material particles and creates or strengthens the bond between the metallic build material particles. In other words, the "cured green part" is an intermediate part with a shape representative of the final 3D printed part and that includes metallic build material bound together by at least substantially cured polymer particles of the binder fluid (with which the metallic build material was patterned). Compared to the patterned green part, the mechanical strength of the cured green part is greater, and in some instances, the cured green part can be handled or extracted from the build material platform.

It is to be understood that the term "green" when referring to the patterned green part or the cured green part does not connote color, but rather indicates that the part is not yet fully processed.

As used herein, the term "at least substantially polymer-free gray part" refers to a cured green part that has been exposed to a heating process that initiates thermal decomposition of the polymer particles so that the polymer particles are at least partially removed. In some instances, volatile organic components of or produced by the thermally decomposed polymer particles are completely removed and a very small amount of nonvolatile residue from the thermally decomposed polymer particles may remain (e.g., <1 wt % of the initial binder). In other instances, the thermally decomposed polymer particles (including any products and residues) are completely removed. In other words, the "at least substantially polymer-free gray part" refers to an intermediate part with a shape representative of the final 3D printed part and that includes metallic build material bound together as a result of i) weak sintering (i.e., low level necking between the particles, which is able to preserve the part shape), or ii) a small amount of the cured polymer particles remaining, or iii) capillary forces and/or Van der Waals resulting from polymer particle removal, and/or iv) any combination of i, ii, and/or iii.

It is to be understood that the term "gray" when referring to the at least substantially polymer-free gray part does not connote color, but rather indicates that the part is not yet fully processed.

The at least substantially polymer-free gray part may have porosity similar to or greater than the cured green part (due to polymer particle removal), but the porosity is at least substantially eliminated during the transition to the 3D printed part.

As used herein, the terms "3D printed part," "3D part," or "metallic part" refer to a completed, sintered part.

In the examples disclosed herein, the binder fluid includes polymer particles, which are dispersed throughout a liquid vehicle of the binder fluid. When applied to a layer of metallic build material, the liquid vehicle is capable of wetting the build material and the polymer particles are capable of penetrating into the microscopic pores of the layer (i.e., the spaces between the metallic build material particles). As such, the polymer particles can move into the vacant spaces between the metallic build material particles. The polymer particles in the binder fluid can be activated or cured by heating the binder fluid (which may be accomplished by heating an entire layer of the metallic build material on at least a portion of which the binder fluid has been selectively applied) to about the melting point of the polymer particles. When activated or cured, the binder fluid forms an at least substantially continuous network gluing the metallic build material particles into the cured green part shape. The cured green part has enough mechanical strength such that it is able to withstand extraction from the build material platform without being deleteriously affected (e.g., the shape is not lost).

Once extracted, the cured green part can be debound by heating the cured green part to the thermal decomposition temperature of the polymer particles to thermally decompose the polymer particles. When at least some of the polymer particles are thermally decomposed, an at least substantially polymer-free gray part is formed. Then, the at least substantially polymer-free gray part can be heated to a sintering temperature to sinter the metallic build material particles and form the metallic part.

Referring now to FIG. 1, an example of a 3D printing system 10 is depicted. It is to be understood that the 3D printing system 10 may include additional components and that some of the components described herein may be removed and/or modified. Furthermore, components of the 3D printing system 10 depicted in FIG. 1 may not be drawn to scale and thus, the 3D printing system 10 may have a different size and/or configuration other than as shown therein.

The three-dimensional (3D) printing system 10 generally includes a supply 14 of metallic build material 16; a build material distributor 18; a supply of a binder fluid 36, the binder fluid 36 including a liquid vehicle and polymer particles dispersed in the liquid vehicle; an inkjet applicator 24 for selectively dispensing the binder fluid 36 (FIG. 2C); at least one heat source 32, 32'; a controller 28; and a non-transitory computer readable medium having stored thereon computer executable instructions to cause the controller 28 to: utilize the build material distributor 18 and the inkjet applicator 24 to iteratively form multiple layers 34 (FIG. 2B) of metallic build material 16 which are applied by the build material distributor 18 and have received the binder fluid 36, thereby creating a patterned green part 42 (FIG. 2E), and utilize the at least one heat source 32, 32' to heat the patterned green part 42 to about a melting point of the polymer particles, thereby activating the binder fluid 36 and creating a cured green part 42', heat the cured green part 42' to a thermal decomposition temperature of the polymer particles, thereby creating an at least substantially polymer-free gray part 48, and heat the at least substantially polymer-free gray part 48 to a sintering temperature to form a metallic part 50.

As shown in FIG. 1, the printing system 10 includes a build area platform 12, the build material supply 14 containing metallic build material particles 16, and the build material distributor 18.

The build area platform 12 receives the metallic build material 16 from the build material supply 14. The build area platform 12 may be integrated with the printing system 10 or may be a component that is separately insertable into the printing system 10. For example, the build area platform 12 may be a module that is available separately from the printing system 10. The build area platform 12 that is shown is also one example, and could be replaced with another support member, such as a platen, a fabrication/print bed, a glass plate, or another build surface.

Figure 2A:
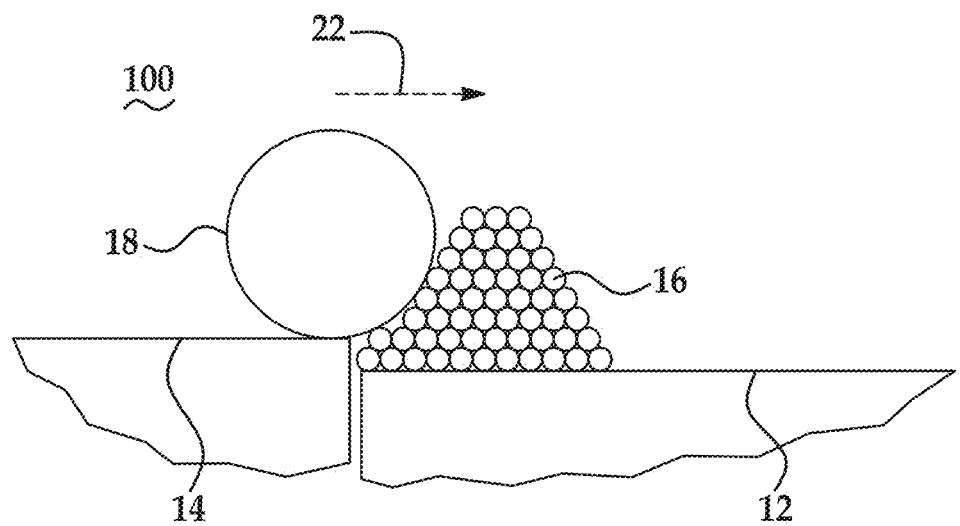
FIGS. 2A through 2F are schematic views depicting the formation of a patterned green part, a cured green part, an at least substantially polymer-free gray part, and a 3D metallic part using examples of a 3D printing method disclosed herein.
Figure 2B:
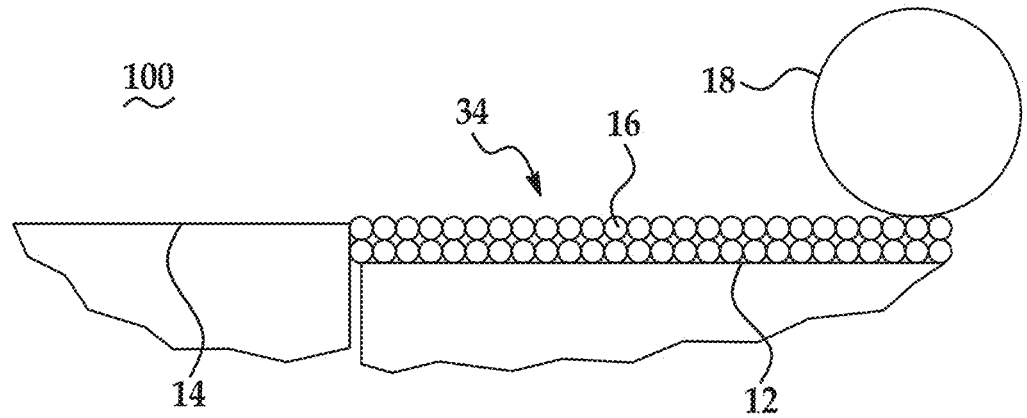
Figure 2C:
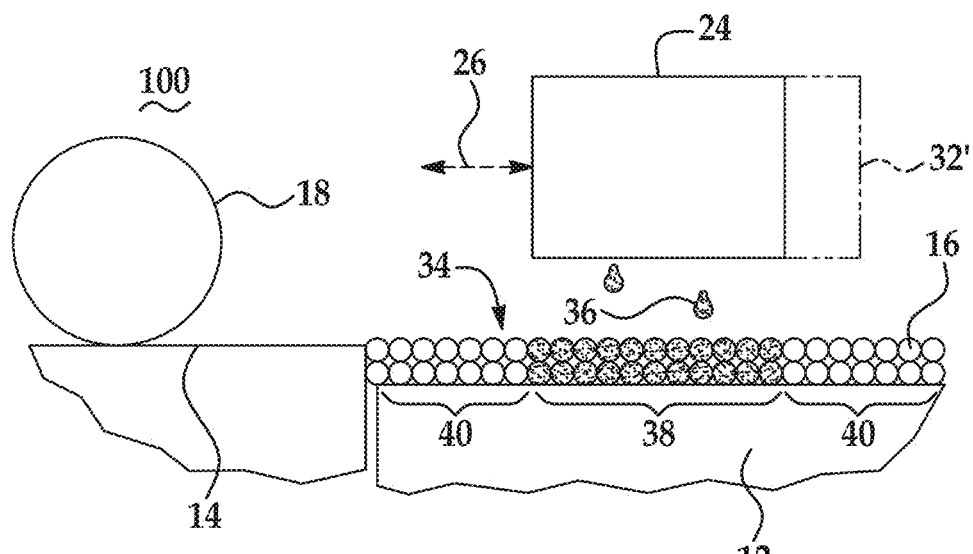
Figure 2D:
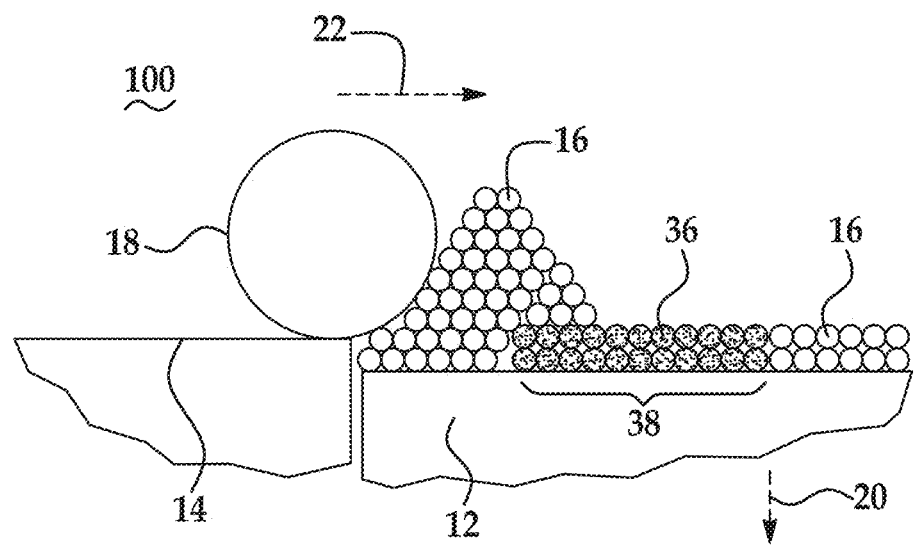

The build area platform 12 may be moved in a direction as denoted by the arrow 20, e.g., along the z-axis, so that metallic build material 16 may be delivered to the platform 12 or to a previously formed layer of metallic build material 16 (see FIG. 2D). In an example, when the metallic build material particles 16 are to be delivered, the build area platform 12 may be programmed to advance (e.g., downward) enough so that the build material distributor 18 can push the metallic build material particles 16 onto the platform 12 to form a layer 34 of the metallic build material 16 thereon (see, e.g., FIGS. 2A and 2B). The build area platform 12 may also be returned to its original position, for example, when a new part is to be built.

The build material supply 14 may be a container, bed, or other surface that is to position the metallic build material particles 16 between the build material distributor 18 and the build area platform 12. In some examples, the build material supply 14 may include a surface upon which the metallic build material particles 16 may be supplied, for instance, from a build material source (not shown) located above the build material supply 14. Examples of the build material source may include a hopper, an auger conveyer, or the like. Additionally, or alternatively, the build material supply 14 may include a mechanism (e.g., a delivery piston) to provide, e.g., move, the metallic build material particles 16 from a storage location to a position to be spread onto the build area platform 12 or onto a previously formed layer of metallic build material 16.

The build material distributor 18 may be moved in a direction as denoted by the arrow 22, e.g., along the y-axis, over the build material supply 14 and across the build area platform 12 to spread a layer of the metallic build material 16 over the build area platform 12. The build material distributor 18 may also be returned to a position adjacent to the build material supply 14 following the spreading of the metallic build material 16. The build material distributor 18 may be a blade (e.g., a doctor blade), a roller, a combination of a roller and a blade, and/or any other device capable of spreading the metallic build material particles 16 over the build area platform 12. For instance, the build material distributor 18 may be a counter-rotating roller.

The metallic build material 16 may be any particulate metallic material. In an example, the metallic build material 16 may be a powder. In another example, the metallic build material 16 may have the ability to sinter into a continuous body to form the metallic part 50 (see, e.g., FIG. 2F) when heated to the sintering temperature (e.g., a temperature ranging from about 850° C. to about 1400° C.). By "continuous body," it is meant that the metallic build material particles are merged together to form a single part with little or no porosity and with sufficient mechanical strength to meet the requirements of the desired, final metallic part 50.

While an example sintering temperature range is provided, it is to be understood that this temperature may vary, depending, in part, upon the composition and phase(s) of the metallic build material 16.

In an example, the metallic build material 16 is a single phase metallic material composed of one element. In this example, the sintering temperature may be below the melting point of the single element.

In another example, the metallic build material 16 is composed of two or more elements, which may be in the form of a single phase metallic alloy or a multiple phase metallic alloy. In these other examples, melting generally occurs over a range of temperatures. For some single phase metallic alloys, melting begins just above the solidus temperature (where melting is initiated) and is not complete until the liquidus temperature (temperature at which all the solid has melted) is exceeded. For other single phase metallic alloys, melting begins just above the peritectic temperature. The peritectic temperature is defined by the point where a single phase solid transforms into a two phase solid plus liquid mixture, where the solid above the peritectic temperature is of a different phase than the solid below the peritectic temperature. When the metallic build material 16 is composed of two or more phases (e.g., a multiphase alloy made of two or more elements), melting generally begins when the eutectic or peritectic temperature is exceeded. The eutectic temperature is defined by the temperature at which a single phase liquid completely solidifies into a two phase solid. Generally, melting of the single phase metallic alloy or the multiple phase metallic alloy begins just above the solidus, eutectic, or peritectic temperature and is not complete until the liquidus temperature is exceeded. In some examples, sintering can occur below the solidus temperature, the peritectic temperature, or the eutectic temperature. In other examples, sintering occurs above the solidus temperature, the peritectic temperature, or the eutectic temperature. Sintering above the solidus temperature is known as super solidus sintering, and this technique may be desirable when using larger build material particles and/or to achieve high density. In an example, the build material composition may be selected so that at least 40 vol % of the metallic build material is made up of phase(s) that have a melting point above the desired sintering temperature. It is to be understood that the sintering temperature may be high enough to provide sufficient energy to allow atom mobility between adjacent particles.

Single elements or alloys may be used as the metallic build material 16. Some examples of the metallic build material 16 include steels, stainless steel, bronzes, titanium (Ti) and alloys thereof, aluminum (Al) and alloys thereof, nickel (Ni) and alloys thereof, cobalt (Co) and alloys thereof, iron (Fe) and alloys thereof, nickel cobalt (NiCo) alloys, gold (Au) and alloys thereof, silver (Ag) and alloys thereof, platinum (Pt) and alloys thereof, and copper (Cu) and alloys thereof. Some specific examples include AlSi10Mg, 2xxx series aluminum, 4xxx series aluminum, CoCr MP1, CoCr SP2, MaragingSteel MS1, Hastelloy C, Hastelloy X, NickelAlloy HX, Inconel IN625, Inconel IN718, SS GP1, SS 17-4PH, SS 316L, Ti6Al4V, and Ti-6AI-4V ELI7. While several example alloys have been provided, it is to be understood that other alloy build materials may be used, such as PbSn soldering alloys.

Any metallic build material 16 may be used that is in powder form at the outset of the 3D printing method(s) disclosed herein. As such, the melting point, solidus temperature, eutectic temperature, and/or peritectic temperature of the metallic build material 16 may be above the temperature of the environment in which the patterning portion of the 3D printing method is performed (e.g., above 40° C.). In some examples, the metallic build material 16 may have a melting point ranging from about 850° C. to about 3500° C. In other examples, the metallic build material 16 may be an alloy having a range of melting points. Alloys may include metals with melting points as low as −39° C. (e.g., mercury), or 30° C. (e.g., gallium), or 157° C. (indium), etc.

The metallic build material 16 may be made up of similarly sized particles or differently sized particles. In the examples shown herein (FIG. 1 and FIGS. 2A-2F), the metallic build material 16 includes similarly sized particles. The term "size", as used herein with regard to the metallic build material 16, refers to the diameter of a substantially spherical particle (i.e., a spherical or near-spherical particle having a sphericity of >0.84), or the average diameter of a non-spherical particle (i.e., the average of multiple diameters across the particle). Substantially spherical particles of this particle size have good flowability and can be spread relatively easily. As an example, the average particle size of the particles of the metallic build material 16 may range from about 1 µm to about 200 µm. As another example, the average size of the particles of the metallic build material 16 ranges from about 10 µm to about 150 µm. As still another example, the average size of the particles of the metallic build material 16 ranges from 15 µm to about 100 µm.

As shown in FIG. 1, the printing system 10 also includes an applicator 24, which may contain the binder fluid 36 (shown in FIG. 2C) disclosed herein.

The binder fluid 36 includes at least the liquid vehicle and the polymer particles. In some instances, the binder fluid 36 consists of the liquid vehicle and the polymer particles, without any other components.

Figure 2E:
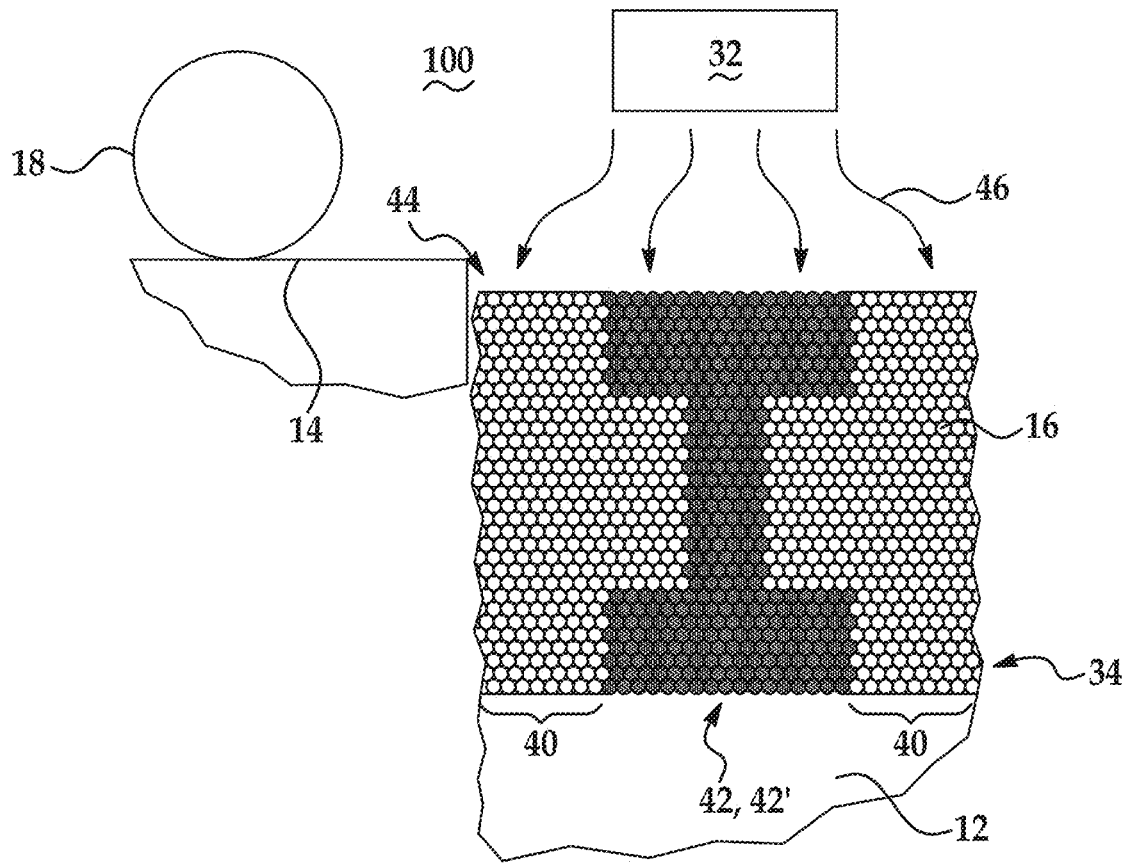
Figure 2F:
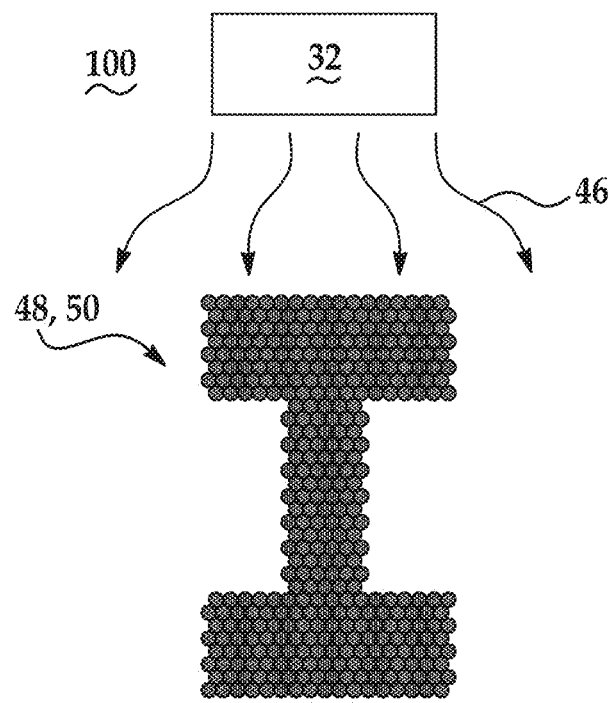

The polymer particles are sacrificial intermediate binders in that they are present in various stages of the green part 42, 42' (shown in FIG. 2E) that is formed, and then are ultimately removed (through thermal decomposition) from the gray part 48, and thus are not present in the final sintered 3D part 50 (shown in FIG. 2F).

In the examples disclosed herein, the polymer particles may be dispersed in the liquid vehicle. The polymer particles may have several different morphologies. For example, the polymer particles may be individual spherical particles containing polymer compositions of high $T_g$ hydrophilic (hard) component(s) and/or low $T_g$ hydrophobic (soft) component(s) that may be interdispersed according to IPN (interpenetrating networks), although it is contemplated that the high $T_g$ hydrophilic and $T_g$ hydrophobic components may be interdispersed in other ways. For another example, the polymer particles may be made of a low $T_g$ hydrophobic core surrounded by a continuous or discontinuous high $T_g$ hydrophilic shell. For another example, the polymer particle morphology may resemble a raspberry, in which a low $T_g$ hydrophobic core is surrounded by several smaller high $T_g$ hydrophilic particles that are attached to the core. For still another example, the polymer particles may include 2, 3, or 4 particles that are at least partially attached to one another.

In examples herein, high $T_g$ hydrophilic component(s)/ shell/particles and low $T_g$ hydrophobic component(s)/core/ particles may be defined in relation to each other (i.e., the high $T_g$ hydrophilic component(s)/shell/particles have a $T_g$ higher than the low $T_g$ hydrophobic component(s)/core/ particles, and the low $T_g$ hydrophobic component(s)/core/ particles have a $T_g$ lower than the high $T_g$ hydrophilic component(s)/shell/particles). In some examples, the high $T_g$ hydrophilic component(s)/shell/particles have a $T_g$ higher than 25° C. In other examples, the high $T_g$ hydrophilic component(s)/shell/particles have a $T_g$ higher than 45° C. In some examples, the low $T_g$ hydrophobic component(s)/core/ particles have a $T_g$ lower than 25° C. In other examples, the low $T_g$ hydrophobic component(s)/core/particles have a $T_g$ lower than 5° C.

The polymer particles may be any latex polymer (i.e., polymer that is capable of being dispersed in an aqueous medium) that is jettable via inkjet printing (e.g., thermal inkjet printing or piezoelectric inkjet printing). In some examples disclosed herein, the polymer particles are heteropolymers or co-polymers. The heteropolymers may include a more hydrophobic component and a more hydrophilic component. In these examples, the hydrophilic component renders the particles dispersible in the binder fluid 36, while the hydrophobic component is capable of coalescing upon exposure to heat in order to temporarily bind the metallic build material particles 16 together to form the cured green part 42'.

Examples of low $T_g$ monomers that may be used to form the hydrophobic component include C4 to C8 alkyl acrylates or methacrylates, styrene, substituted methyl styrenes, polyol acrylates or methacrylates, vinyl monomers, vinyl esters, or the like. Some specific examples include methyl methacrylate, butyl acrylate, butyl methacrylate, hexyl acrylate, hexyl methacrylate, ethyl acrylate, ethyl methacrylate, propyl acrylate, propyl methacrylate, 2-ethylhexyl acrylate, 2-ethylhexy methacrylate, hydroxyethyl acrylate, lauryl acrylate, lauryl methacrylate, octadecyl acrylate, octadecyl methacrylate, isobornyl acrylate, isobornyl methacrylate, stearyl methacrylate, ethylene glycol dimethacrylate, diethylene glycol dimethacrylate, triethylene glycol dimethacrylate, tetrahydrofurfuryl acrylate, alkoxylated tetrahydrofurfuryl acrylate, 2-phenoxyethyl methacrylate, benzyl acrylate, ethoxylated nonyl phenol methacrylate, cyclohexyl methacrylate, trimethyl cyclohexyl methacrylate, t-butyl methacrylate, n-octyl methacrylate, trydecyl methacrylate, isodecyl acrylate, dimethyl maleate, dioctyl maleate, acetoacetoxyethyl methacrylate, diacetone acrylamide, pentaerythritol tri-acrylate, pentaerythritol tetra-acrylate, pentaerythritol tri-methacrylate, pentaerythritol tetra-methacrylate, divinylbenzene, styrene, methylstyrenes (e.g., α-methyl styrene, p-methyl styrene), vinyl chloride, vinylidene chloride, vinylbenzyl chloride, acrylonitrile, methacrylonitrile, N-vinyl imidazole, N-vinylcarbazole, N-vinyl-caprolactam, combinations thereof, derivatives thereof, or mixtures thereof.

The heteropolymer may be formed of at least two of the previously listed monomers, or at least one of the previously listed monomers and a high $T_g$ hydrophilic monomer, such as an acidic monomer. Examples of acidic monomers that can be polymerized in forming the polymer particles include acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2 acrylamido-2-methyl-1-propanesulfonic acid, combinations thereof, derivatives thereof, or mixtures thereof. Other examples of high $T_g$ hydrophilic monomers include acrylamide, methacrylamide, monohydroxylated monomers, monoethoxylated monomers, polyhydroxylated monomers, or polyethoxylated monomers.

In the heteropolymers disclosed herein, the low $T_g$ hydrophobic component(s) make up from about 65% to about 100% of the polymer, and the high $T_g$ hydrophilic component(s) make up from about 0.1% to about 35% of the polymer.

In an example, the selected monomer(s) is/are polymerized to form the desirable heteropolymer. Any suitable polymerization process may be used. For example, hydrophobic-hydrophilic polymer particles can be formed by any of a number of techniques, such as: i) attaching a high $T_g$ hydrophilic polymer onto the surface of a low $T_g$ hydrophobic polymer, ii) copolymerizing low $T_g$ hydrophobic and high $T_g$ hydrophilic monomers using ratios that lead to a more high $T_g$ hydrophilic outer component or shell, iii) adding high $T_g$ hydrophilic monomer (or excess high $T_g$ hydrophilic monomer) toward the end of the copolymerization process so there is a higher concentration of high $T_g$ hydrophilic monomer copolymerized at or near the surface, or iv) any other method known in the art to generate a more high $T_g$ hydrophilic outer component or shell relative to the inner component or core. These hydrophobic-hydrophilic polymer particles may be core-shell particles. It is to be understood, however, that these techniques may also form polymer particles with other morphologies, as noted herein.

The polymer particles may have a particle size that can be jetted via thermal inkjet printing or piezoelectric printing or continuous inkjet printing. In an example, the particle size of the polymer particles ranges from about 10 nm to about 300 nm.

In some examples, the polymer particles have a glass transition temperature ($T_g$) that is greater (e.g., >) than ambient temperature. In other examples, the polymer particles have a glass transition temperature ($T_g$) that is much greater (e.g., >>) than ambient temperature (i.e., at least 15° higher than ambient). As used therein, "ambient temperature" may refer to room temperature (e.g., ranging about 18° C. to about 22° C.), or to the temperature of the environment in which the 3D printing method is performed. Examples of the 3D printing environment ambient temperature may range from about 40° C. to about 50° C. The glass transition temperature $T_g$ of the bulk material (e.g., the more hydrophobic portion) of the polymer particles may range from 25° C. to about 125° C. In an example, the glass transition temperature $T_g$ of the bulk material (e.g., the more hydrophobic portion) of the polymer particles is about 40° C. or higher. The glass transition temperature $T_g$ of the bulk material may be any temperature that enables the polymer particles to be inkjet printed without becoming too soft at the printer operating temperatures.

The polymer particles may have a melting point ranging from about 125° C. to about 200° C. In an example, the polymer particles may have a melting point of about 160° C.

The weight average molecular weight of the polymer particles may range from about 5,000 Mw to about 500,000 Mw. In some examples, the weight average molecular weight of the polymer particles ranges from about 100,000 Mw to about 500,000 Mw. In some other examples, the weight average molecular weight of the polymer particles ranges from about 150,000 Mw to 300,000 Mw.

The polymer particles may be present in the binder fluid 36 in an amount ranging from about 2 wt % to about 30 wt %, or from about 3 wt % to about 20 wt %, or from about 5 wt % to about 15 wt % (based upon the total wt % of the binder fluid 36). In another example, the polymer particles may be present in the binder fluid 36 in an amount ranging from about 20 vol % to about 40 vol % (based upon the total vol % of the binder fluid 36). It is believed that these polymer particle loadings provide a balance between the binder fluid 36 having jetting reliability and binding efficiency.

In some examples, the binder fluid 36 includes a coalescing solvent in addition to the polymer particles. In these examples, the coalescing solvent plasticizes the polymer particles and enhances the coalescing of the polymer particles upon exposure to heat in order to temporarily bind the metallic build material particles 16 together to form the cured green part 42'. In some examples, the binder fluid 36 may consist of the polymer particles and the coalescing solvent (with no other components). In these examples, the liquid vehicle consists of the coalescing solvent (with no other components), and the coalescing solvent makes up the balance of the binder fluid 36.

In some examples, the coalescing solvent may be a lactone, such as 2-pyrrolidinone, 1-(2-hydroxyethyl)-2-pyrrolidone, etc. In other examples, the coalescing solvent may be a glycol ether or a glycol ether esters, such as tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, etc. In still other examples, the coalescing solvent may be a water-soluble polyhydric alcohol, such as 2-methyl-1,3-propanediol, etc. In still other examples, the coalescing solvent may be a combination of any of the examples above. In still other examples, the coalescing solvent is selected from the group consisting of 2-pyrrolidinone, 1-(2-hydroxyethyl)-2-pyrrolidone, tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, 2-methyl-1,3-propanediol, and a combination thereof.

The coalescing solvent may be present in the binder fluid 36 in an amount ranging from about 0.1 wt % to about 50 wt % (based upon the total wt % of the binder fluid 36). In some examples, greater or lesser amounts of the coalescing solvent may be used depending, in part, upon the jetting architecture of the applicator 24.

In an example, the polymer particles are present in the binder fluid in an amount ranging from about 2 wt % to about 30 wt %, and the coalescing solvent is present in the binder fluid in an amount ranging from about 0.1 wt % to about 50 wt %.

As mentioned above, the binder fluid 36 includes the polymer particles and the liquid vehicle. As used herein, "liquid vehicle" may refer to the liquid fluid in which the polymer particles are dispersed to form the binder fluid 36. A wide variety of liquid vehicles, including aqueous and non-aqueous vehicles, may be used with the binder fluid 36. In some instances, the liquid vehicle consists of a primary solvent with no other components. In other examples, the binder fluid 36 may include other ingredients, depending, in part, upon the applicator 24 that is to be used to dispense the binder fluid 36. Examples of other suitable binder fluid components include co-solvent(s), surfactant(s), antimicrobial agent(s), anti-kogation agent(s), viscosity modifier(s), pH adjuster(s) and/or sequestering agent(s). The presence of a co-solvent and/or a surfactant in the binder fluid 36 may assist in obtaining a particular wetting behavior with the metallic build material 16.

The primary solvent may be water or a non-aqueous solvent (e.g., ethanol, acetone, n-methyl pyrrolidone, aliphatic hydrocarbons, etc.). In some examples, the binder fluid 36 consists of the polymer particles and the primary solvent (with on other components). In these examples, the primary solvent makes up the balance of the binder fluid 36.

Classes of organic co-solvents that may be used in the water-based binder fluid 36 include aliphatic alcohols, aromatic alcohols, diols, glycol ethers, polyglycol ethers, 2-pyrrolidones, caprolactams, formamides, acetamides, glycols, and long chain alcohols. Examples of these co-solvents include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Examples of some suitable co-solvents include water-soluble high-boiling point solvents (i.e., humectants), which have a boiling point of at least 120° C., or higher. Some examples of high-boiling point solvents include 2-pyrrolidone (boiling point of about 245° C.), 2-methyl-1,3-propanediol (boiling point of about 212° C.), and combinations thereof. The co-solvent(s) may be present in the binder fluid 36 in a total amount ranging from about 1 wt % to about 50 wt % based upon the total wt % of the binder fluid 36, depending upon the jetting architecture of the applicator 24.

Surfactant(s) may be used to improve the wetting properties and the jettability of the binder fluid 36. Examples of suitable surfactants include a self-emulsifiable, nonionic wetting agent based on acetylenic diol chemistry (e.g., SURFYNOL® SEF from Air Products and Chemicals, Inc.), a nonionic fluorosurfactant (e.g., CAPSTONE® fluorosurfactants from DuPont, previously known as ZONYL FSO), and combinations thereof. In other examples, the surfactant is an ethoxylated low-foam wetting agent (e.g., SURFYNOL® 440 or SURFYNOL® CT-111 from Air Products and Chemical Inc.) or an ethoxylated wetting agent and molecular defoamer (e.g., SURFYNOL® 420 from Air Products and Chemical Inc.). Still other suitable surfactants include non-ionic wetting agents and molecular defoamers (e.g., SURFYNOL® 104E from Air Products and Chemical Inc.) or water-soluble, non-ionic surfactants (e.g., TERGITOL™ TMN-6 or TERGITOL™ 15-S-7 from The Dow Chemical Company). In some examples, it may be desirable to utilize a surfactant having a hydrophilic-lipophilic balance (HLB) less than 10.

Whether a single surfactant is used or a combination of surfactants is used, the total amount of surfactant(s) in the binder fluid 36 may range from about 0.01 wt % to about 10 wt % based on the total wt % of the binder fluid 36. In another example, the total amount of surfactant(s) in the binder fluid 36 may range from about 0.5 wt % to about 2.5 wt % based on the total wt % of the binder fluid 36.

The liquid vehicle may also include antimicrobial agent(s). Suitable antimicrobial agents include biocides and fungicides. Example antimicrobial agents may include the NUOSEPT™ (Troy Corp.), UCARCIDE™ (Dow Chemical Co.), ACTICIDE® M20 (Thor), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from Dow Chemical Co.). The biocide or antimicrobial may be added in any amount ranging from about 0.05 wt % to about 0.5 wt % (as indicated by regulatory usage levels) with respect to the total wt % of the binder fluid 36.

An anti-kogation agent may be included in the binder fluid 36. Kogation refers to the deposit of dried ink (e.g., binder fluid 36) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS™ O3A or CRODAFOS™ N-3 acid from Croda), or a combination of oleth-3-phosphate and a low molecular weight (e.g., <5,000) polyacrylic acid polymer (e.g., commercially available as CARBOSPERSE™ K-7028 Polyacrylate from Lubrizol). Whether a single anti-kogation agent is used or a combination of anti-kogation agents is used, the total amount of anti-kogation agent(s) in the binder fluid 36 may range from greater than 0.20 wt % to about 0.62 wt % based on the total wt % of the binder fluid 36. In an example, the oleth-3-phosphate is included in an amount ranging from about 0.20 wt % to about 0.60 wt %, and the low molecular weight polyacrylic acid polymer is included in an amount ranging from about 0.005 wt % to about 0.03 wt %.

Sequestering agents, such as EDTA (ethylene diamine tetra acetic acid), may be included to eliminate the deleterious effects of heavy metal impurities, and buffer solutions may be used to control the pH of the binder fluid 36. From 0.01 wt % to 2 wt % of each of these components, for example, can be used. Viscosity modifiers and buffers may also be present, as well as other additives known to those skilled in the art to modify properties of the binder fluid 36 as desired. Such additives can be present in amounts ranging from about 0.01 wt % to about 20 wt %.

The applicator 24 may be scanned across the build area platform 12 in the direction indicated by the arrow 26, e.g., along the y-axis. The applicator 24 may be, for instance, an inkjet applicator, such as a thermal inkjet printhead, a piezoelectric printhead, etc., and may extend a width of the build area platform 12. While the applicator 24 is shown in FIG. 1 as a single applicator, it is to be understood that the applicator 24 may include multiple applicators that span the width of the build area platform 12. Additionally, the applicators 24 may be positioned in multiple printbars. The applicator 24 may also be scanned along the x-axis, for instance, in configurations in which the applicator 24 does not span the width of the build area platform 12 to enable the applicator 24 to deposit the binder fluid 36 over a large area of a layer of the metallic build material 16. The applicator 24 may thus be attached to a moving X-Y stage or a translational carriage (neither of which is shown) that moves the applicator 24 adjacent to the build area platform 12 in order to deposit the binder fluid 36 in predetermined areas of a layer of the metallic build material 16 that has been formed on the build area platform 12 in accordance with the method(s) disclosed herein. The applicator 24 may include a plurality of nozzles (not shown) through which the binder fluid 36 is to be ejected.

The applicator 24 may deliver drops of the binder fluid 36 at a resolution ranging from about 300 dots per inch (DPI) to about 1200 DPI. In other examples, the applicator 24 may deliver drops of the binder fluid 36 at a higher or lower resolution. The drop velocity may range from about 2 m/s to about 24 m/s and the firing frequency may range from about 1 kHz to about 100 kHz. In one example, each drop may be in the order of about 10 picoliters (pl) per drop, although it is contemplated that a higher or lower drop size may be used. For example, the drop size may range from about 1 pl to about 400 pl. In some examples, applicator 24 is able to deliver variable size drops of the binder fluid 36.

Each of the previously described physical elements may be operatively connected to a controller 28 of the printing system 10. The controller 28 may control the operations of the build area platform 12, the build material supply 14, the build material distributor 18, and the applicator 24. As an example, the controller 28 may control actuators (not shown) to control various operations of the 3D printing system 10 components. The controller 28 may be a computing device, a semiconductor-based microprocessor, a central processing unit (CPU), an application specific integrated circuit (ASIC), and/or another hardware device. Although not shown, the controller 28 may be connected to the 3D printing system 10 components via communication lines.

The controller 28 manipulates and transforms data, which may be represented as physical (electronic) quantities within the printer's registers and memories, in order to control the physical elements to create the 3D part 50. As such, the controller 28 is depicted as being in communication with a data store 30. The data store 30 may include data pertaining to a 3D part 50 to be printed by the 3D printing system 10. The data for the selective delivery of the metallic build material particles 16, the binder fluid 36, etc. may be derived from a model of the 3D part 50 to be formed. For instance, the data may include the locations on each layer of metallic build material particles 16 that the applicator 24 is to deposit the binder fluid 36. In one example, the controller 28 may use the data to control the applicator 24 to selectively apply the binder fluid 36. The data store 30 may also include machine readable instructions (stored on a non-transitory computer readable medium) that are to cause the controller 28 to control the amount of metallic build material particles 16 that is supplied by the build material supply 14, the movement of the build area platform 12, the movement of the build material distributor 18, the movement of the applicator 24, etc.

As shown in FIG. 1, the printing system 10 may also include a heater 32, 32'. In some examples, the heater 32 includes a conventional furnace or oven, a microwave, or devices capable of hybrid heating (i.e., conventional heating and microwave heating). This type of heater 32 may be used for heating the entire build material cake 44 (see FIG. 2E)

after the printing is finished or for heating the cured green part 42' or for heating the at least substantially polymer-free gray part 48 after the cured green part 42' is removed from the build material cake 44 (see FIG. 2F). In some examples, patterning may take place in the printing system 10, and then the build material platform 12 with the patterned green part 42 thereon may be detached from the system 10 and placed into the heater 32 for the various heating stages. In other examples, the heater 32 may be a conductive heater or a radiative heater (e.g., infrared lamps) that is integrated into the system 10. These other types of heaters 32 may be placed below the build area platform 12 (e.g., conductive heating from below the platform 12) or may be placed above the build area platform 12 (e.g., radiative heating of the build material layer surface). Combinations of these types of heating may also be used. These other types of heaters 32 may be used throughout the 3D printing process. In still other examples, the heater 32' may be a radiative heat source (e.g., a curing lamp) that is positioned to heat each layer 34 (see FIG. 2C) after the binder fluid 36 has been applied thereto. In the example shown in FIG. 1, the heater 32' is attached to the side of the applicator 24, which allows for printing and heating in a single pass. In some examples, both the heater 32 and the heater 32' may be used.

Referring now to FIGS. 2A through 2F, an example of the 3D printing method is depicted. Prior to execution of the method 100 or as part of the method 100, the controller 28 may access data stored in the data store 30 pertaining to a 3D part 50 that is to be printed. The controller 28 may determine the number of layers of metallic build material particles 16 that are to be formed, and the locations at which binder fluid 36 from the applicator 24 is to be deposited on each of the respective layers.

As shown in FIGS. 2A and 2B, the method 100 includes applying the metallic build material 16. In FIG. 2A, the build material supply 14 may supply the metallic build material particles 16 into a position so that they are ready to be spread onto the build area platform 12. In FIG. 2B, the build material distributor 18 may spread the supplied metallic build material particles 16 onto the build area platform 12. The controller 28 may execute control build material supply instructions to control the build material supply 14 to appropriately position the metallic build material particles 16, and may execute control spreader instructions to control the build material distributor 18 to spread the supplied metallic build material particles 16 over the build area platform 12 to form a layer 34 of metallic build material particles 16 thereon. As shown in FIG. 2B, one layer 34 of the metallic build material particles 16 has been applied.

The layer 34 has a substantially uniform thickness across the build area platform 12. In an example, the thickness of the layer 34 ranges from about 30 µm to about 300 µm, although thinner or thicker layers may also be used. For example, the thickness of the layer 34 may range from about 20 µm to about 500 µm. The layer thickness may be about 2× the particle diameter (as shown in FIG. 2B) at a minimum for finer part definition. In some examples, the layer thickness may be about 1.2× (i.e., 1.2 times) the particle diameter.

Referring now to FIG. 2C, the method 100 continues by selectively applying the binder fluid 36 on a portion 38 of the metallic build material 16. As illustrated in FIG. 2C, the binder fluid 36 may be dispensed from the applicator 24. The applicator 24 may be a thermal inkjet printhead, a piezoelectric printhead, etc., and the selectively applying of the binder fluid 36 may be accomplished by the associated inkjet printing technique. As such, the selectively applying of the binder fluid 36 may be accomplished by thermal inkjet printing or piezo electric inkjet printing.

The controller 28 may execute instructions to control the applicator 24 (e.g., in the directions indicated by the arrow 26) to deposit the binder fluid 36 onto predetermined portion(s) 38 of the metallic build material 16 that are to become part of a patterned green part 42 and are to ultimately be sintered to form the 3D part 50. The applicator 24 may be programmed to receive commands from the controller 28 and to deposit the binder fluid 36 according to a pattern of a cross-section for the layer of the 3D part 50 that is to be formed. As used herein, the cross-section of the layer of the 3D part 50 to be formed refers to the cross-section that is parallel to the surface of the build area platform 12. In the example shown in FIG. 2C, the applicator 24 selectively applies the binder fluid 36 on those portion(s) 38 of the layer 34 that are to be fused to become the first layer of the 3D part 50. As an example, if the 3D part that is to be formed is to be shaped like a cube or cylinder, the binder fluid 36 will be deposited in a square pattern or a circular pattern (from a top view), respectively, on at least a portion of the layer 34 of the metallic build material particles 16. In the example shown in FIG. 2C, the binder fluid 36 is deposited in a square pattern on the portion 38 of the layer 34 and not on the portions 40.

As mentioned above, the binder fluid 36 includes the polymer particles and the liquid vehicle. As also mentioned above, in some examples the binder fluid 36 also includes the coalescing solvent (as or in addition to the liquid vehicle). It is to be understood that a single binder fluid 36 may be selectively applied to pattern the layer 34, or multiple binder fluids 36 may be selectively applied to pattern the layer 34.

While not shown, the method 100 may include preparing the binder fluid 36 prior to selectively applying the binder fluid 36. Preparing the binder fluid 36 may include preparing the polymer particles and then adding the polymer particles to the liquid vehicle.

When each of the polymer particles contains a low $T_g$ hydrophobic component and a high $T_g$ hydrophilic component, the polymer particles may be prepared by any suitable method. As examples, the polymer particles may be prepared by one of the following methods.

In an example, each of the polymer particles may be prepared by polymerizing low $T_g$ hydrophobic monomers to form the low $T_g$ hydrophobic component, polymerizing high $T_g$ hydrophilic monomers to form the high $T_g$ hydrophilic component, and attaching the high $T_g$ hydrophilic component onto the surface of the low $T_g$ hydrophobic component.

In another example, each of the polymer particles may be prepared by polymerizing the low $T_g$ hydrophobic monomers and the high $T_g$ hydrophilic monomers at a ratio of the low $T_g$ hydrophobic monomers to the high $T_g$ hydrophilic monomers that ranges from 5:95 to 30:70. In this example, the soft low $T_g$ hydrophobic monomers may dissolve in the hard high $T_g$ hydrophilic monomers.

In still another example, each of the polymer particles may be prepared by starting the polymerization process with the low $T_g$ hydrophobic monomers, then adding the high $T_g$ hydrophilic monomers, and then finishing the polymerization process. In this example, the polymerization process may cause a higher concentration of the high $T_g$ hydrophilic monomers to polymerize at or near the surface of the low $T_g$ hydrophobic component.

In still another example, each of the polymer particles may be prepared by starting a copolymerization process with the low $T_g$ hydrophobic monomers and the high $T_g$ hydrophilic monomers, then adding additional high $T_g$ hydrophilic monomers, and then finishing the copolymerization process. In this example, the copolymerization process may cause a higher concentration of the high $T_g$ hydrophilic monomers to copolymerize at or near the surface of the low $T_g$ hydrophobic component.

The low $T_g$ hydrophobic monomers and/or the high $T_g$ hydrophilic monomers used in any of these examples may be any of the low $T_g$ hydrophobic monomers and/or the high $T_g$ hydrophilic monomers (respectively) listed above. In an example, the low $T_g$ hydrophobic monomers are selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and the high $T_g$ hydrophilic monomers are selected from the group consisting of acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof.

The resulting polymer particles may exhibit a core-shell structure, a mixed or intermingled polymeric structure, or some other morphology.

When the binder fluid 36 is selectively applied in the desired portion(s) 38, the polymer particles (present in the binder fluid 36) infiltrate the inter-particles spaces among the metallic build material particles 16. The volume of the binder fluid 36 that is applied per unit of metallic build material 16 in the patterned portion 38 may be sufficient to fill a major fraction, or most of the porosity existing within the thickness of the portion 38 of the layer 34.

It is to be understood that portions 40 of the metallic build material 16 that do not have the binder fluid 36 applied thereto also do not have the polymer particles introduced thereto. As such, these portions do not become part of the patterned green part 42 that is ultimately formed.

The processes shown in FIGS. 2A through 2C may be repeated to iteratively build up several patterned layers and to form the patterned green part 42 (see FIG. 2E).

FIG. 2D illustrates the initial formation of a second layer of metallic build material 16 on the layer 34 patterned with the binder fluid 36. In FIG. 2D, following deposition of the binder fluid 36 onto predetermined portion(s) 38 of the layer 34 of metallic build material 16, the controller 28 may execute instructions to cause the build area platform 12 to be moved a relatively small distance in the direction denoted by the arrow 20. In other words, the build area platform 12 may be lowered to enable the next layer of metallic build material 16 to be formed. For example, the build material platform 12 may be lowered a distance that is equivalent to the height of the layer 34. In addition, following the lowering of the build area platform 12, the controller 28 may control the build material supply 14 to supply additional metallic build material 16 (e.g., through operation of an elevator, an auger, or the like) and the build material distributor 18 to form another layer of metallic build material particles 16 on top of the previously formed layer 34 with the additional metallic build material 16. The newly formed layer may be patterned with binder fluid 36.

Referring back to FIG. 2C, in another example of the method 100, the layer 34 may be exposed to heating using heater 32' after the binder fluid 36 is applied to the layer 34 and before another layer is formed. The heater 32' may be used for activating the binder fluid 36 during printing layer-by-layer, and for producing a stabilized and cured green part layer. Heating to form the cured green part layer may take place at a temperature that is capable of activating (or curing) the binder fluid 36, but that is not capable of melting or sintering the metallic build material 16. In an example, the activation temperature is about the melting point of the polymer particles. Other examples of suitable activation temperatures are provided below. In this example, the processes shown in FIGS. 2A through 2C (including the heating of the layer 34) may be repeated to iteratively build up several cured layers and to produce the cured green part 42'. The cured green part 42' can then be exposed to the processes described in reference to FIG. 2F.

Repeatedly forming and patterning new layers (without curing each layer) results in the formation of a build material cake 44, as shown in FIG. 2E, which includes the patterned green part 42 residing within the non-patterned portions 40 of each of the layers 34 of metallic build material 16. The patterned green part 42 is a volume of the build material cake 44 that is filled with the metallic build material 16 and the binder fluid 36 within the inter-particle spaces. The remainder of the build material cake 44 is made up of the non-patterned metallic build material 16.

Also as shown in FIG. 2E, the build material cake 44 may be exposed to heat or radiation to generate heat, as denoted by the arrows 46. The heat applied may be sufficient to activate the binder fluid 36 in the patterned green part 42 and to produce a stabilized and cured green part 42'. In one example, the heat source 32 may be used to apply the heat to the build material cake 44. In the example shown in FIG. 2E, the build material cake 44 may remain on the build area platform 12 while being heated by the heat source 32. In another example, the build area platform 12, with the build material cake 44 thereon, may be detached from the applicator 24 and placed in the heat source 32. Any of the previously described heat sources 32 and/or 32' may be used.

The activation/curing temperature may depend, in part, on one or more of: the $T_g$ of the polymer particles, the melt viscosity of the polymer particles, and/or whether and which coalescing solvent is used. In an example, heating to form the cured green part 42' may take place at a temperature that is capable of activating (or curing) the binder fluid 36, but that is not capable of sintering the metallic build material 16 or of thermally degrading the polymer particles of the binder fluid 36. In an example, the activation temperature is about the melting point of the bulk material of the polymer particles of the binder fluid 36 and below the thermal decomposition temperature of the polymer particles (i.e., below a temperature threshold at which thermal decomposition occurs). For a majority of suitable latex-based polymer particles, the upper limit of the activation/curing temperature ranges from about 250° C. to about 270° C. Above this temperature threshold, the polymer particles would chemically degrade into volatile species and leave the patterned green part 42, and thus would stop performing their function. In other examples, the binder fluid 36 activation temperature may be greater than the melting point of the polymer particles. As an example, the binder fluid activation temperature may range from about 50° C. to about 200° C. As another example, the binder fluid activation temperature may range from about 100° C. to about 200° C. As still another example, the binder fluid activation temperature may range from about 80° C. to about 200° C. As still another example, the binder fluid activation temperature may be about 90° C.

The length of time at which the heat 46 is applied and the rate at which the patterned green part 42 is heated may be dependent, for example, on one or more of: characteristics of the heat or radiation source 32, 32', characteristics of the polymer particles, characteristics of the metallic build material 16 (e.g., metal type, particle size, etc.), and/or the characteristics of the 3D part 50 (e.g., wall thickness). The patterned green part 42 may be heated at the binder fluid activation temperature for an activation/curing time period ranging from about 1 minute to about 360 minutes. In an example, the activation/curing time period is 30 minutes. In another example, the activation/curing time period may range from about 2 minutes to about 240 minutes. The patterned green part 42 may be heated to the binder fluid activation temperature at a rate of about 1° C./minute to about 10° C./minute, although it is contemplated that a slower or faster heating rate may be used. The heating rate may depend, in part, on one or more of: the binder fluid 36 used, the size (i.e., thickness and/or area (across the x-y plane)) of the layer 34 of metallic build material 16, and/or the characteristics of the 3D part 50 (e.g., size, wall thickness, etc.). In an example, patterned green part 42 is heated to the binder fluid activation temperature at a rate of about 2.25° C./minute.

Heating to about the melting point of the polymer particles causes the polymer particles to coalesce into a continuous polymer phase among the metallic build material particles 16 of the patterned green part 42. As mentioned above, the coalescing solvent (when included in the binder fluid 36) plasticizes the polymer particles and enhances the coalescing of the polymer particles. The continuous polymer phase may act as a heat-activated adhesive between the metallic build material particles 16 to form the stabilized, cured green part 42'.

Heating to form the cured green part 42' may also result in the evaporation of a significant fraction of the fluid from the patterned green part 42. The evaporated fluid may include any of the binder fluid components. Fluid evaporation may result in some densification, through capillary action, of the cured green part 42'.

The stabilized, cured green part 42' exhibits handleable mechanical durability.

The cured green part 42' may then be extracted from the build material cake 44. The cured green part 42' may be extracted by any suitable means. In an example, the cured green part 42' may be extracted by lifting the cured green part 42' from the unpatterned metallic build material particles 16. An extraction tool including a piston and a spring may be used.

When the cured green part 42' is extracted from the build material cake 44, the cured green part 42' may be removed from the build area platform 12 and placed in a heating mechanism. The heating mechanism may be the heater 32.

In some examples, the cured green part 42' may be cleaned to remove unpatterned metallic build material particles 16 from its surface. In an example, the cured green part 42' may be cleaned with a brush and/or an air jet.

After the extraction and/or the cleaning of the cured green part 42', the cured green part 42' may be heated to remove the activated polymer particles (which have coalesced into the continuous polymer phase) to produce an at least substantially polymer-free gray part 48, as shown in FIG. 2F. In other words, the cured green part 42' may be heated to remove the continuous polymer phase. Then, the at least substantially polymer-free gray part 48 may be sintered to form the final 3D part 50, also as shown in FIG. 2F. Heating to de-bind and heating to sinter take place at two different temperatures, where the temperature for de-binding is lower than the temperature for sintering. Both the de-binding and the sintering heating stages are generally depicted in FIG. 2F, where heat or radiation to generate heat may be applied as denoted by the arrows 46 from the heat source 32.

Heating to de-bind is accomplished at a thermal decomposition temperature that is sufficient to thermally decompose the continuous polymer phase. As such, the temperature for de-binding depends upon the material of the polymer particles of the binder fluid 36. In an example, the thermal decomposition temperature ranges from about 250° C. to about 600° C. In another example, the thermal decomposition temperature ranges from about 280° C. to about 600° C., or to about 500° C. The continuous polymer phase may have a clean thermal decomposition mechanism (e.g., leaves <5 wt % solid residue of the initial binder, and in some instances <1 wt % solid residue of the initial binder). The smaller residue percentage (e.g., close to 0%) is more desirable. During the de-binding stage, the long chains of the continuous polymer phase decompose first intro shorter molecular fragments, which turn into a liquid phase of lower viscosity. Capillary pressure developing during evaporation of this liquid pulls the metallic build material particles 16 together leading to further densification and formation of the at least substantially polymer-free gray part 48.

While not being bound to any theory, it is believed that the at least substantially polymer-free gray part 48 may maintain its shape due, for example, to one or more of: i) the low amount of stress experience by the at least substantially polymer-free gray part 48 due to it not being physically handled, ii) low level necking occurring between the metallic build material particles 16 at the thermal decomposition temperature of the polymer particles, and/or iii) capillary forces pushing the metallic build material particles 16 together generated by the removal of the continuous polymer phase. The at least substantially polymer-free gray part 48 may maintain its shape although the continuous polymer phase is at least substantially removed and the metallic build material particles 16 is not yet sintered. Heating to form the substantially polymer-free gray part 48 may begin the initial stages of sintering, which can result in the formation of weak bonds that are strengthened during final sintering.

Heating to sinter is accomplished at a sintering temperature that is sufficient to sinter the remaining metallic build material particles 16. The sintering temperature is highly depending upon the composition of the metallic build material particles 16. During heating/sintering, the at least substantially polymer-free gray part 48 may be heated to a temperature ranging from about 80% to about 99.9% of the melting point or the solidus, eutectic, or peritectic temperature of the metallic build material 16. In another example, the at least substantially polymer-free gray part 48 may be heated to a temperature ranging from about 90% to about 95% of the melting point or the solidus, eutectic, or peritectic temperature of the metallic build material 16. In still another example, the at least substantially polymer-free gray part 48 may be heated to a temperature ranging from about 60% to about 85% of the melting point or the solidus, eutectic, or peritectic temperature of the metallic build material 16. The sintering heating temperature may also depend upon the particle size and time for sintering (i.e., high temperature exposure time). As an example, the sintering temperature may range from about 850° C. to about 1400° C. In another example, the sintering temperature is at least 900° C. An example of a sintering temperature for bronze is about 850° C., and an example of a sintering temperature for stainless steel is about 1300° C. While these temperatures are provided as sintering temperature examples, it is to be understood that the sintering heating temperature depends upon the metallic build material 16 that is utilized, and may be higher or lower than the provided examples. Heating at a suitable temperature sinters and fuses the metallic build material particles 16 to form a completed 3D part 50, which may be even further densified relative to the at least substantially polymer-free gray part 48. For example, as a result of sintering, the density may go from 50% density to over 90%, and in some cases very close to 100% of the theoretical density.

The length of time at which the heat 46 (for each of de-binding and sintering) is applied and the rate at which the part 42', 48 is heated may be dependent, for example, on one or more of: characteristics of the heat or radiation source 32, characteristics of the polymer particles, characteristics of the metallic build material 16 (e.g., metal type, particle size, etc.), and/or the characteristics of the 3D part 50 (e.g., wall thickness).

The cured green part 42' may be heated at the thermal decomposition temperature for a thermal decomposition time period ranging from about 10 minutes to about 72 hours. In an example, the thermal decomposition time period is 60 minutes. In another example, thermal decomposition time period is 180 minutes. The cured green part 42' may be heated to the thermal decomposition temperature at a rate ranging from about 0.5° C./minute to about 20° C./minute. The heating rate may depend, in part, on one or more of: the amount of the continuous polymer phase in the cured green part 42', the porosity of the cured green part 42', and/or the characteristics of the cured green part 42'/3D part 50 (e.g., size, wall thickness, etc.).

The at least substantially polymer-free gray part 48 may be heated at the sintering temperature for a sintering time period ranging from about 20 minutes to about 15 hours. In an example, the sintering time period is 240 minutes. In another example, the sintering time period is 360 minutes. The at least substantially polymer-free gray part 48 may be heated to the sintering temperature at a rate ranging from about 1° C./minute to about 20° C./minute. In an example, the at least substantially polymer-free gray part 48 is heated to the sintering temperature at a rate ranging from about 10° C./minute to about 20° C./minute. A high ramp rate up to the sintering temperature may be desirable to produce a more favorable grain structure or microstructure. However, in some instances, slower ramp rates may be desirable. As such, in another example, the at least substantially polymer-free gray part 48 is heated to the sintering temperature at a rate ranging from about 1° C./minute to about 3° C./minute. In yet another example, the at least substantially polymer-free gray part 48 is heated to the sintering temperature at a rate of about 1.2° C./minute. In still another example, the at least substantially polymer-free gray part 48 is heated to the sintering temperature at a rate of about 2.5° C./minute.

In example of the method 100: the heating of the cured green part 42' to the thermal decomposition temperature is performed for a thermal decomposition time period ranging from about 30 minutes to about 72 hours; and the heating of the at least substantially polymer-free gray part 48 to the sintering temperature is performed for a sintering time period ranging from about 20 minutes to about 15 hours. In another example of the method 100: the heating of the cured green part 42' to the thermal decomposition temperature is accomplished at a rate ranging from about 0.5° C./minute to about 10° C./minute; and the heating of the at least substantially polymer-free gray part 48 to the sintering temperature is accomplished at a rate ranging from about 1° C./minute to about 20° C./minute.

In some examples of the method 100, the heat 46 (for each of de-binding and sintering) is applied in an environment containing an inert gas, a low reactivity gas, a reducing gas, or a combination thereof. In other words, the heating of the cured green part 42' to the thermal decomposition temperature and the heating of the at least substantially polymer-free gray part 48 to the sintering temperature are accomplished in an environment containing an inert gas, a low reactivity gas, a reducing gas, or a combination thereof. The de-binding may be accomplished in an environment containing an inert gas, a low reactivity gas, and/or a reducing gas so that the continuous polymer phase thermally decomposes rather than undergo an alternate reaction which would fail to produce the at least substantially polymer-free gray part 48 and/or to prevent the oxidation of the metallic build material 16. The sintering may be accomplished in an environment containing an inert gas, a low reactivity gas, and/or a reducing gas so that the metallic build material 16 will sinter rather than undergoing an alternate reaction (e.g., an oxidation reaction) which would fail to produce the metallic 3D part 50. Examples of inert gas include argon gas, helium gas, etc. An example of a low reactivity gas includes nitrogen gas, and examples of reducing gases include hydrogen gas, carbon monoxide gas, etc.

In other examples of the method 100, the heat 46 (for each of de-binding (i.e., heating of the cured green body 42' to the thermal decomposition temperature) and sintering (i.e., heating of the at least substantially polymer free grey part to the sintering temperature)) is applied in an environment containing carbon in addition to an inert gas, a low reactivity gas, a reducing gas, or a combination thereof. The de-binding and the sintering may be accomplished in an environment containing carbon to reduce the partial pressure of oxygen in the environment and further prevent the oxidation of the metallic build material 16 during de-binding and sintering. An example of the carbon that may be placed in the heating environment includes graphite rods. In other examples, a graphite furnace may be used.

In still other examples of the method 100, the heat 46 (for each of de-binding and sintering) is applied in a low gas pressure or vacuum environment. The de-binding and the sintering may be accomplished in a low gas pressure or vacuum environment so that the continuous polymer phase thermally decomposes and/or to prevent the oxidation of the metallic build material 16. Moreover, sintering at the low gas pressure or under vacuum may allow for more complete or faster pore collapse, and thus higher density parts. However, vacuum may not be used during sintering when the metallic build material 16 (e.g., Cr) is capable of evaporating in such conditions. In an example, the low pressure environment is at a pressure ranging from about 1E-5 torr ($1*10^{-5}$ torr) to about 10 torr.

Although not shown, the operations depicted in FIGS. 2E and 2F may be automated and the controller 28 may control the operations.

Figure 5:
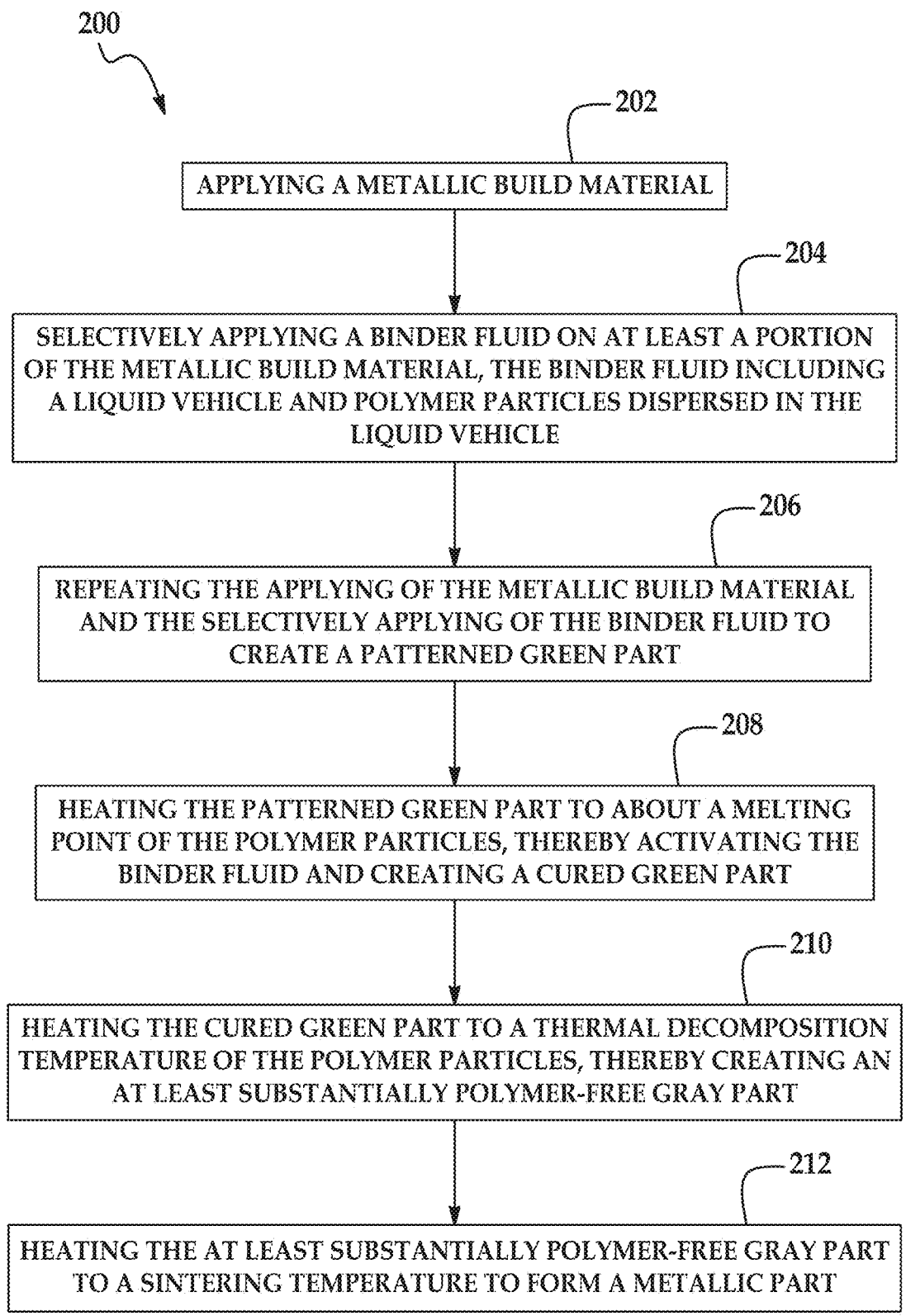
FIG. 5 is a flow diagram illustrating an example of a 3D printing method disclosed herein.

An example of the 3D printing method 200 is depicted in FIG. 5. It is to be understood that examples of the method 200 shown in FIG. 5 are discussed in detail herein, e.g., in FIGS. 2A-2F and the text corresponding thereto.

As shown at reference numeral 202, the method 200 includes applying the metallic build material 16.

As shown at reference numeral 204, method 200 further includes selectively applying the binder fluid 36 on at least a portion 38 of the metallic build material 16, the binder fluid 36 including the liquid vehicle and the polymer particles dispersed in the liquid vehicle.

As shown at reference numeral 206, method 200 further includes repeating the applying of the metallic build material 16 and the selectively applying of the binder fluid 36 to create the patterned green part 42.

As shown at reference numeral 208, method 200 further includes heating the patterned green part 42 to about a melting point of the polymer particles, thereby activating the binder fluid 36 and creating the cured green part 42'.

As shown at reference numeral 210, method 200 further includes heating the cured green part 42' to a thermal decomposition temperature of the polymer particles, thereby creating an at least substantially polymer-free gray part 48.

As shown at reference numeral 212, method 200 further includes heating the at least substantially polymer-free gray part 48 to a sintering temperature to form a metallic part 50.

In an example of the method 200: the polymer particles have a glass transition temperature ranging from about 25° C. to about 125° C.; the melting point ranges from about 125° C. to about 200° C.; the thermal decomposition temperature ranges from about 250° C. to about 600° C.; and the sintering temperature ranges from about 850° C. to about 1400° C.

In another example of the method 200: the applying of the metallic build material 16, the selectively applying of the binder fluid 36, the repeating of the applying and the selectively applying, and the heating of the patterned green part 42 to about the melting point are accomplished on the build area platform 12; and after the heating of the patterned green part 42 to about the melting point, the method further comprises: removing the cured green part 42' from the build area platform 12; and placing the cured green part in a heating mechanism 36.

In still another example of the method 200: the metallic build material is a powder with an average particle size ranging from about 5 µm to about 200 µm; the metallic build material is to sinter into a continuous body to form the metallic part when heated to the sintering temperature; and the sintering temperature is below a melting point, a solidus temperature, a eutectic temperature, or a peritectic temperature of the metallic build material.

To further illustrate the present disclosure, examples are given herein. It is to be understood that these examples are provided for illustrative purposes and are not to be construed as limiting the scope of the present disclosure.

EXAMPLES

Example 1

An example 3D metallic part (referred to as "example part 1") was printed. The metallic build material used to print example part 1 was a spherical bronze (90 wt % Cu and 10 wt % Sn) powder with a D50 (i.e., the median of the particle size distribution, where ½ the population is above this value and ½ is below this value) of 32 µm. The binder fluid used to print example part 1 contained an acrylic binder latex dispersion as the polymer particles, 2-methyl-1,3-propanediol and 2-pyrrolidinone as coalescing solvents. The general formulation of the binder fluid used to print example part 1 is shown in Table 1, with the wt % of each component that was used. The weight percentage of the acrylic binder latex dispersion represents the % actives, i.e., the total acrylic binder latex solids present in the final formulation.

TABLE 1

| Ingredient | Specific component | Example binder fluid (wt %) |
| --- | --- | --- |
| Coalescing solvents | 2-methyl-1,3-propanediol | 9.00 |
| | 2-pyrrolidinone | 16.00 |

TABLE 1-continued

| Ingredient | Specific component | Example binder fluid (wt %) |
| --- | --- | --- |
| Surfactants | TERGITOL ™ 15-S-7 | 1.00 |
| | CAPSTONE ® FS-35 | 1.98 |
| Polymer particles | Acrylic binder latex dispersion | 38.65 |
| Water | | Balance |

Figure 3A:
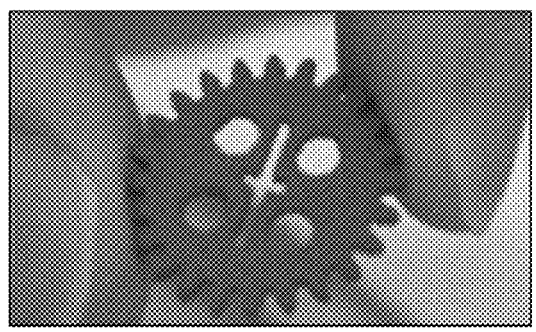
FIGS. 3A and 3B are black and white photographs showing a cured green part (FIG. 3A) and a 3D metallic part (FIG. 3B) formed by an example of the 3D printing method disclosed herein.

Example part 1 was printed by applying layers of the bronze powder and the binder fluid to form the patterned green part in the form of a gear. The thickness of each layer was about 100 µm. The patterned green part was cured by heating the whole powderbed and build material cake in an oven. The patterned green part was heated from room temperature to 180° C. at a rate of 2.25° C./minute, and held at 180° C. for 30 minutes. The cured green part was then easily extracted from the unpatterned bronze powder and cleaned of the unpatterned bronze powder with a brush and air jet. The cured green part after de-caking is shown in FIG. 3A.

Then, the cured green part was placed in a tube furnace (MT1 Corp. OTF-1200X—S-UL) on elevated alumina standoffs to allow for good gas flow around the cured green part with a nitrogen and hydrogen gas mixture (96% $N_2$ and 4% $H_2$) flowing at a rate of approximately 14 cc/minute at room temperature and atmospheric pressure. The cured green part was heated from 180° C. to 300° C. at a rate of 0.5° C./minute, and held at 300° C. for 60 minutes to ensure that the polymer particles were completely burnt out and to produce the at least substantially polymer-free gray part. The at least substantially polymer-free gray part was heated from 300° C. to 850° C. at a rate of 1.2° C./minute, and held at 850° C. for 360 minutes to sinter the at least substantially polymer-free gray part and produce example part 1. Example part 1 was cooled from 850° C. to room temperature at a rate of 5° C./minute.

Figure 3B:
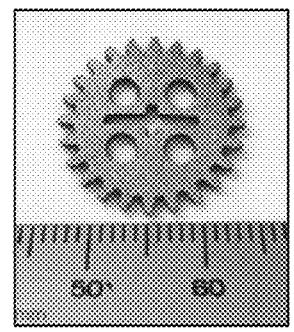

Example part 1 is shown in FIG. 3B. The density of example part 1 was measure by gas pycnometry, and found to be 8.63 $g/cm^3$, which is 98% of a bulk density of 8.7 $g/cm^3$.

Example 2

Another example 3D metallic part (referred to as "example part 2") was printed. The metallic build material used to print example part 2 was a spherical stainless steel (316L) powder with a D50 (i.e., the median of the particle size distribution, where ½ the population is above this value and ½ is below this value) of 42 µm. The binder fluid used to print example part 2 was the binder fluid described in example 1.

Figure 4A:
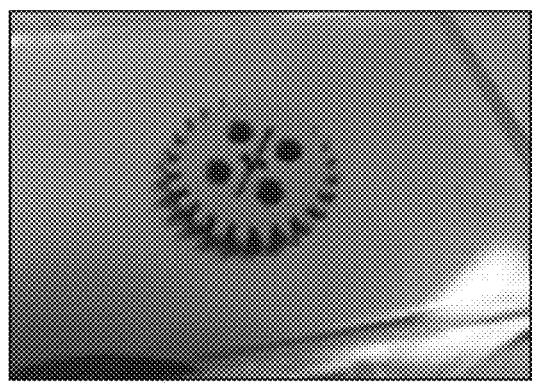
FIGS. 4A and 4B are black and white photographs showing another cured green part (FIG. 4A) and another 3D metallic part (FIG. 4B) formed by another example of the 3D printing method disclosed herein.

Example part 2 was printed by applying layers of the stainless steel powder and the binder fluid to form the patterned green part in the form of a gear. The thickness of each layer was about 100 µm. The patterned green part was cured by heating the whole powderbed and build material cake in an oven. The patterned green part was heated from room temperature to 180° C. at a rate of 2.25° C./minute, and held at 180° C. for 30 minutes. The cured green part was then easily extracted from the unpatterned stainless steel powder, and was cleaned of the unpatterned stainless steel powder with a brush and air jet. The cured green part after de-caking is shown in FIG. 4A.

Then, the cured green part was placed in a tube furnace (MTI Corp. GSL-1600X-50-UL) on elevated alumina stand-offs to allow for good gas flow around the cured green part with a nitrogen and hydrogen gas mixture (96% $N_2$ and 4% $H_2$) flowing at a rate of approximately 14 cc/minute at room temperature and atmospheric pressure. Graphite rods were placed in close proximity to the cured green part to reduce the partial pressure of oxygen in the furnace during binder removal and sintering. The cured green part was heated from 238° C. to 300° C. at a rate of 0.5° C./minute, and held at 300° C. for 180 minutes to ensure that the polymer particles were completely burnt out and to produce the at least substantially polymer-free gray part. The at least substantially polymer-free gray part was heated from 300° C. to 1350° C. at a rate of 2.5° C./minute, and held at 1350° C. for 240 minutes to sinter the at least substantially polymer-free gray part and produce example part 2. Example part 2 was cooled from 1350° C. to room temperature at a rate of 5° C./minute.

Figure 4B:
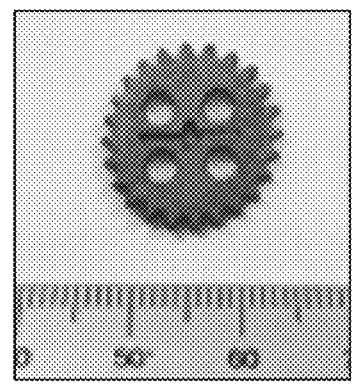

Example part 2 is shown in FIG. 4B. The density of example part 2 was measure using the Archimedes technique, and found to be 7.88 g/cm³, which is 98.5% of a bulk density of 8.0 g/cm³.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 1 µm to about 200 µm should be interpreted to include the explicitly recited limits of from about 5 µm to about 200 µm, as well as individual values, such as 7.15 µm, 15 µm, 65 µm, 100.5 µm, 125 µm, 195 µm, etc., and sub-ranges, such as from about 75 µm to about 175 µm, from about 20 µm to about 125 µm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A three-dimensional (3D) printing system, comprising:
a container containing a supply of metallic build material;
a build material distributor;
an inkjet applicator containing a supply of a binder fluid and to selectively apply the binder fluid, the binder fluid including a liquid vehicle and polymer particles dispersed in the liquid vehicle, the polymer particles including a hydrophobic component and a hydrophilic component having a glass transition temperature ($T_g$) that is higher than the hydrophobic component, and each of the polymer particles containing one of:
(i) polymerized hydrophobic monomers that form the hydrophobic component, polymerized hydrophilic monomers that form the hydrophilic component, and the hydrophilic component attached to a surface of the hydrophobic component;
(ii) a ratio of polymerized hydrophobic monomers to polymerized hydrophilic monomers ranging from 5:95 to 30:70;
(iii) a higher concentration of polymerized hydrophilic monomers at or near a surface of the hydrophobic component; and
(iv) a core-shell structure with copolymerized hydrophobic and hydrophilic monomers at a core of the core-shell structure and a higher concentration of copolymerized hydrophilic monomers at a shell of the core-shell structure;
at least one heat source;
a controller; and
a non-transitory computer readable medium having stored thereon computer executable instructions to cause the controller to:
utilize the build material distributor and the inkjet applicator to iteratively form multiple layers of the metallic build material which are applied by the build material distributor and have received the binder fluid, thereby creating a patterned green part; and
utilize the at least one heat source to:
heat the patterned green part to about a melting point of the polymer particles for a curing time period ranging from about 1 minute to about 360 minutes, thereby activating the binder fluid and creating a cured green part;
heat the cured green part to a thermal decomposition temperature of the polymer particles for a thermal decomposition time period ranging from about 10 minutes to about 72 hours, thereby creating an at least substantially polymer-free gray part; and
heat the at least substantially polymer-free gray part to a sintering temperature for a sintering time period ranging from about 20 minutes to about 15 hours to form a metallic part.

2. The system as defined in claim 1 wherein:
the polymer particles have a glass transition temperature ($T_g$) ranging from about 25° C. to about 125° C.;
the melting point ranges from about 125° C. to about 200° C.;
the thermal decomposition temperature ranges from about 250° C. to about 600° C.; and
the sintering temperature ranges from about 850° C. to about 1400° C.

3. The system as defined in claim 1 wherein the heating of the cured green part to the thermal decomposition temperature and the heating of the at least substantially polymer-free gray part to the sintering temperature are accomplished in an environment containing an inert gas, nitrogen gas, a reducing gas, or a combination thereof.

4. The system as defined in claim 3 wherein the environment further contains carbon.

5. The system as defined in claim 1 wherein the binder fluid further includes a coalescing solvent selected from the group consisting of 2-pyrrolidinone, 1-(2-hydroxyethyl)-2-pyrrolidone, tripropylene glycol mono methyl ether, dipropylene glycol mono methyl ether, dipropylene glycol mono propyl ether, tripropylene glycol mono n-butyl ether, propylene glycol phenyl ether, dipropylene glycol methyl ether acetate, diethylene glycol mono butyl ether, diethylene glycol mono hexyl ether, ethylene glycol phenyl ether, diethylene glycol mono n-butyl ether acetate, ethylene glycol mono n-butyl ether acetate, 2-methyl-1,3-propanediol, and a combination thereof.

6. The system as defined in claim 5 wherein:
the polymer particles are present in the binder fluid in an amount ranging from about 2 wt % to about 30 wt %; and
the coalescing solvent is present in the binder fluid in an amount ranging from about 0.1 wt % to about 50 wt %.

7. The system as defined in claim 1 wherein:
the hydrophobic monomers of the polymerized hydrophobic monomers are selected from the group consisting of C4 to C8 alkyl acrylate monomers, C4 to C8 alkyl methacrylate monomers, styrene monomers, substituted methyl styrene monomers, vinyl monomers, vinyl ester monomers, and combinations thereof; and
the hydrophilic monomers of the polymerized hydrophilic monomers are selected from the group consisting of acidic monomers, unsubstituted amide monomers, alcoholic acrylate monomers, alcoholic methacrylate monomers, C1 to C2 alkyl acrylate monomers, C1 to C2 alkyl methacrylate monomers, and combinations thereof.

8. The system as defined in claim 1 wherein:
the metallic build material is a powder with an average particle size ranging from about 10 μm to about 150 μm;
the metallic build material is to sinter into a continuous body to form the metallic part when heated to the sintering temperature; and
the sintering temperature is below a melting point, a solidus temperature, a eutectic temperature, or a peritectic temperature of the metallic build material.

9. The system as defined in claim 1 wherein each of the multiple layers of the metallic build material has a thickness ranging from about 30 μm to about 300 μm.

10. A three-dimensional (3D) printing method, the method utilizing a controller including a non-transitory computer readable medium having stored thereon computer executable instructions to cause at least one step of the method, the method comprising:
using a build material distributor, applying a metallic build material from a container containing a supply of the metallic build material;
using an inkjet applicator, selectively applying a binder fluid on at least a portion of the metallic build material, the binder fluid including a liquid vehicle and polymer particles dispersed in the liquid vehicle, the polymer particles including a hydrophobic component and a hydrophilic component having a glass transition temperature ($T_g$) that is higher than the hydrophobic component, and each of the polymer particles containing one of:
(i) polymerized hydrophobic monomers that form the hydrophobic component, polymerized hydrophilic monomers that form the hydrophilic component, and the hydrophilic component attached to a surface of the hydrophobic component;
(ii) a ratio of polymerized hydrophobic monomers to polymerized hydrophilic monomers ranging from 5:95 to 30:70;
(iii) a higher concentration of polymerized hydrophilic monomers at or near a surface of the hydrophobic component; and
(iv) a core-shell structure with copolymerized hydrophobic and hydrophilic monomers at a core of the core-shell structure and a higher concentration of copolymerized hydrophilic monomers at a shell of the core-shell structure;
repeating the applying of the metallic build material and the selectively applying of the binder fluid to create a patterned green part;
using at least one heat source, heating the patterned green part to about a melting point of the polymer particles for a curing time period ranging from about 1 minute to about 360 minutes, thereby activating the binder fluid and creating a cured green part;
using the at least one heat source, heating the cured green part to a thermal decomposition temperature of the polymer particles for a thermal decomposition time period ranging from about 10 minutes to about 72 hours, thereby creating an at least substantially polymer-free gray part; and
using the at least one heat source, heating the at least substantially polymer-free gray part to a sintering temperature for a sintering time period ranging from about 20 minutes to about 15 hours to form a metallic part.

11. The method as defined in claim 10 wherein
the heating of the cured green part to the thermal decomposition temperature is performed for a thermal decomposition time period ranging from about 30 minutes to about 72 hours.

12. The method as defined in claim 10 wherein:
the heating of the cured green part up to the thermal decomposition temperature is accomplished at a rate ranging from about 0.5° C./minute to about 10° C./minute; and
the heating of the at least substantially polymer-free gray part up to the sintering temperature is accomplished at a rate ranging from about 1° C./minute to about 20° C./minute.

13. The method as defined in claim 10 wherein:
the applying of the metallic build material, the selectively applying of the binder fluid, the repeating of the applying and the selectively applying, and the heating of the patterned green part to about the melting point are accomplished on a build area platform; and
after the heating of the patterned green part to about the melting point, the method further comprises:
removing the cured green part from the build area platform; and
placing the cured green part in a heating mechanism.

14. The method as defined in claim 10 wherein the selectively applying of the binder fluid is accomplished by thermal inkjet printing or piezo electric inkjet printing.

* * * * *